(12) United States Patent
Beshai et al.

(10) Patent No.: US 8,837,497 B2
(45) Date of Patent: Sep. 16, 2014

(54) STATE INFORMATION AND ROUTING TABLE UPDATES IN LARGE SCALE DATA NETWORKS

(75) Inventors: Maged E. Beshai, Sittsville (CA); Richard Vickers, Kanata (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

(21) Appl. No.: 13/599,461

(22) Filed: Aug. 30, 2012

(65) Prior Publication Data

US 2013/0051246 A1 Feb. 28, 2013

Related U.S. Application Data

(60) Division of application No. 11/208,056, filed on Aug. 19, 2005, now Pat. No. 8,265,085, which is a division of application No. 10/747,077, filed on Dec. 30, 2003, now Pat. No. 6,944,131, which is a continuation of application No. 09/405,003, filed on Sep. 27, 1999, now Pat. No. 6,744,775.

(51) Int. Cl.
*H04L 12/28* (2006.01)
*H04L 12/26* (2006.01)
*H04L 12/751* (2013.01)

(52) U.S. Cl.
CPC .............. *H04L 12/28* (2013.01); *H04L 12/26* (2013.01); *H04L 45/02* (2013.01)

USPC .......................................... 370/400; 709/223

(58) Field of Classification Search
CPC ..................................................... H04L 12/28
USPC .......................................... 370/400; 709/223
See application file for complete search history.

(56) References Cited

U.S. PATENT DOCUMENTS

| | | | | |
|---|---|---|---|---|
| 5,065,312 A | * | 11/1991 | Bruckert et al. | 714/11 |
| 5,467,345 A | * | 11/1995 | Cutler et al. | 370/229 |
| 6,205,148 B1 | * | 3/2001 | Takahashi et al. | 370/401 |
| 6,639,692 B1 | * | 10/2003 | Li et al. | 358/2.1 |

\* cited by examiner

*Primary Examiner* — Wei Zhao
(74) *Attorney, Agent, or Firm* — Anderson Gorecki & Rouille LLP

(57) ABSTRACT

In a communication network comprising nodes and links between the nodes, a controller node disseminates link state information. A nodal routing table exists at each node comprising routes between pairs of nodes. The nodal routing table is either populated by the given node based on network information received from the controlling node or populated at the controlling node and received by the given node. Each node receives heartbeat signals from its neighboring nodes. An unexpected delay between heartbeat signals may be perceived as a failure of a link. The perceived failure of that link is reported by the perceiving node to the controlling node. Upon receiving link failure information from a node, the controlling node may determine a subset of nodes in the network influenced by the link failure and indicate the link failure to the determined subset of influenced nodes.

19 Claims, 22 Drawing Sheets

Figure 5

SOURCE NODES

| SINK NODES | 0 | 1 | 2 | 3 | 4 | 5 | 6 | 7 |
|---|---|---|---|---|---|---|---|---|
| 0 |  | 1-0<br>1-5-0 | 2-1-0 | 3-4-5-0<br>3-2-1-0 | 4-5-0 | 5-0<br>5-1-0 | 6-5-0<br>6-7-1-0 | 7-1-0 |
| 1 | 0-1<br>0-5-1 |  | 2-1<br>2-7-1 | 3-2-1<br>3-7-1 | 4-5-1 | 5-1 | 6-7-1<br>6-5-1<br>6-7-2-1<br>6-5-0-1 | 7-1<br>7-2-1 |
| 2 | 0-1-2 | 1-2<br>1-7-2 |  | 3-2 | 4-3-2<br>4-6-7-2 | 5-1-2<br>5-6-7-2 | 6-7-2 | 7-2 |
| 3 | 0-1-7-3<br>0-1-2-3 | 1-7-3<br>1-2-3 | 2-3<br>2-7-3 |  | 4-3 | 5-4-3<br>5-6-7-3 | 6-7-3<br>6-4-3 | 7-3<br>7-2-3 |
| 4 | 0-5-4 | 1-5-4 | 2-3-4<br>2-7-6-4 | 3-4 |  | 5-4<br>5-6-4 | 6-4<br>6-5-4 | 7-6-4<br>7-3-4 |
| 5 | 0-5<br>0-1-5 | 1-5<br>1-0-5 | 2-1-5 | 3-4-5<br>3-7-6-5 | 4-5<br>4-6-5 |  | 6-5<br>6-4-5 | 7-6-5<br>7-1-5 |
| 6 | 0-5-6<br>0-1-7-6 | 1-7-6<br>1-5-6 | 2-7-6 | 3-7-6<br>3-4-6 | 4-6<br>4-5-6 | 5-6<br>5-4-6 |  | 7-6 |
| 7 | 0-1-7 | 1-7 | 2-7<br>2-1-7 | 3-7 | 4-6-7<br>4-3-7 | 5-6-7<br>5-1-7 | 6-7 |  |

|   | 0 | 1 | 2 | 3 | 4 | 5 | 6 | 7 |
|---|---|---|---|---|---|---|---|---|
| 0 |   | 1-0(8) | 2-1-0(16) | 3-2-1-0(22) | 4-5-0(22) | 5-0(10) | 6-5-0(17) | 7-1-0(15) |
| 1 | 0-1(8) |   | 2-1(8) | 3-2-1(14) | 4-5-1(22) | 5-1(10) | 6-7-1(13) | 7-1(7) |
| 2 | 0-1-2(16) | 1-2(8) |   | 3-2(6) | 4-3-2(15) | 5-1-2(18) | 6-7-2(11) | 7-2(5) |
| 3 | 0-1-2-3(22) | 1-7-3(19) | 2-3(6) |   | 4-3(9) | 5-4-3(21) | 6-4-3(15) | 7-3(12) |
| 4 | 0-5-4(22) | 1-5-4(22) | 2-3-4(15) | 3-4(9) |   | 5-4(12) | 6-4(6) | 7-6-4(12) |
| 5 | 0-5(10) | 1-5(10) | 2-1-5(18) | 3-4-5(21) | 4-5(12) |   | 6-5(7) | 7-6-5(13) |
| 6 | 0-5-6(17) | 1-7-6(13) | 2-7-6(11) | 3-4-6(15) | 4-6(6) | 5-6(7) |   | 7-6(6) |
| 7 | 0-1-7(15) | 1-7(7) | 2-7(5) | 3-7(12) | 4-6-7(12) | 5-6-7(13) | 6-7(6) |   |

| STAGE 1A | A | B | C | D | E | F | G | P | Q | R | |
|---|---|---|---|---|---|---|---|---|---|---|---|
| A-G-Q-R | | | | | | | Q | | R | | ⎫ 1502A |
| | | | | | | | 2 | | 1 | 0 | ⎭ |
| STAGE 2A | A | B | C | D | E | F | G | P | Q | R | |
| A-D-G-Q-R | | | | G | | | Q | | R | | ⎬ 1504A |
| | | | | 3 | | | 2 | | 1 | 0 | |
| STAGE 3A | A | B | C | D | E | F | G | P | Q | R | |
| A-C-F-B-R | | R | F | | | B | Q | | R | | |
| | | 1 | 3 | | | 2 | 2 | | 1 | 0 | |
| STAGE 4A | A | B | C | D | E | F | G | P | Q | R | |
| A-P-E-B-R | | R | | | 8 | | | E | R | | |
| | | 1 | | | 2 | | | 3 | 1 | 0 | |

Figure 15A

| STAGE 1B | A | B | C | D | E | F | G | P | Q | R | |
|---|---|---|---|---|---|---|---|---|---|---|---|
| A-C-F-B-R | | R | F | | | B | | | | | ⎫ 1502B |
| | | 1 | 3 | | | 2 | | | | 0 | ⎭ |
| STAGE 2B | A | B | C | D | E | F | G | P | Q | R | |
| A-D-G-Q-R | | R | F | G | | B | Q | | R | | ⎫ 1504B |
| | | 1 | 3 | 3 | | 2 | 2 | | 1 | 0 | ⎭ |
| STAGE 3B | A | B | C | D | E | F | G | P | Q | R | |
| A-P-E-B-R | | R | F | | B | B | | E | | | |
| | | 1 | 3 | | 2 | 2 | | 3 | | 0 | |

Figure 15B

| STAGE 1C | A | B | C | D | E | F | G | P | Q | R | |
|---|---|---|---|---|---|---|---|---|---|---|---|
| A-P-E-B-R | | R | | | B | | | E | | | ⎫ 1502C |
| | | 1 | | | 2 | | | 3 | | 0 | ⎭ |
| STAGE 2C | A | B | C | D | E | F | G | P | Q | R | |
| A-D-G-Q-R | | R | | G | B | | Q | E | R | | ⎫ 1504C |
| | | 1 | | 3 | 2 | | 2 | 3 | 1 | 0 | ⎭ |

STATE INFORMATION AND ROUTING TABLE UPDATES IN LARGE SCALE DATA NETWORKS

CROSS-REFERENCE To RELATED APPLICATION

This application is a divisional of U.S. patent application Ser. No. 11/208,056, filed Aug. 19, 2005, which is a divisional of U.S. patent application Ser. No. 10/747,077, filed on Dec. 30, 2003, now issued as U.S. Pat. No. 6,944,131, which is a continuation of U.S. Patent Application No. 09/405,003, filed Sep. 27, 1999, now issued as U.S. Pat. No. 6,744,775, the disclosure of which is hereby incorporated by reference in their entirety.

FIELD OF THE INVENTION

The present invention relates to monitoring of communication networks and more particularly to state information and routing table updates in large scale data networks.

BACKGROUND OF THE INVENTION

In a network which comprises nodes and links between the nodes, a node is generally capable of switching connection based traffic, such as in a telephone network or an ATM (asynchronous transfer mode) network, or connectionless traffic, such as in the Internet. In a connection based network, a node may function as a switch whereas, in a connectionless network, a node may function as a router.

A link may be a physical transmission medium between two nodes, for example an optical fiber, or selected wavelengths in an optical fiber. Links may have different capacities and different associated costs. As well, the number of links emanating from each node may vary from one node to another. The capacity of a link may be changed dynamically by adding channels, for instance by assigning new wavelengths in an optical network. The cost of a link may be defined according to several criteria including such qualities as reliability and delay. A directed link is a unidirectional link connecting a node X to a node Y carrying signals from node X to node Y. A node X is a neighbouring node of a node Y if a link of non-zero capacity connects node Y to node X.

A node functioning as a router determines the best route to another node based on various factors such as cost. A route is a link or a chain of links connecting a source node to a sink node. A source node is the node supporting a traffic source (the origin of the traffic) and a sink node is the node supporting a traffic sink (the destination of the traffic). Typically, a node may function as a source node and a sink node for distinct streams of traffic. A source node and a sink node form a "node pair". For a particular node pair, a route set is a number of candidate routes between the source node and the sink node that comprise the node pair. A particular route may have an associated "route capacity" which is equivalent to the capacity of the link with the least capacity of all links comprising the route. As well, a particular route set may have an associated "route set capacity" which is the sum of the capacities of the routes in a route set.

A router may maintain a set of information known about the nodes and the links in a network and may, based on this information, compute a nodal routing table comprising a route set for each possible sink node. Alternatively, network information may be maintained at a network controller where a nodal routing table for each node in the network controlled by the network controller may be created. The network controller then distributes the nodal routing table to the node to which it pertains. In an overall routing table, made up of nodal routing tables, one associated with each node, is stored a route set for each node pair in the network.

For a particular network, if the distance from some nodes in the network to the network controller is large, the network may be partitioned into sub-networks, or domains. The criteria for partitioning may be, for instance, geography. In a domain, one node can be elected to be the domain controller. Any changes in the domain can be received by the domain controller and, rather than each router computing a nodal routing table, the domain controller can compute an overall routing table and distribute a router-specific nodal routing table to each router in the domain. Nodal routing tables may be seen as columns of an overall routing table.

Proper management of a telecommunication network requires that the controller, whether centralised (network controller) or distributed (domain controller and/or router controller), be aware of the network structure and "state information" for each link. The network structure may vary due to planned addition or deletion of nodes. State information falls into two categories: functional information and traffic occupancy information. The functional state of a link normally changes very slowly with time, changing, for example, due to complete or partial failure of a node. The traffic occupancy state is a measure of the occupancy of a link, that is, the proportion of time that a link is carrying traffic. The traffic occupancy state varies more rapidly than the functional state due to the variation of temporal and spatial distribution of traffic loads. Each node in the network must be able to direct its traffic to each other node and, thus, requires network-wide state information.

Any routing of traffic on the basis of fast varying traffic occupancy state information must be done with great caution since it can lead to harmful network oscillations where the end-to-end traffic carried by the network varies violently. Oscillation can occur due to large propagation delays between a point of observation or measurement and a point of control. Oscillations can be avoided, however, by ensuring that any link that is being considered for the establishment of a particular route be made unavailable for the decision process regarding the routing of any other route until a decision is made regarding the route establishment request under consideration. This process is not always easy to implement in a wide-coverage network with potentially long propagation delays. It is therefore preferable that any routing decision based on node traffic occupancy be restricted to nodes directly associated with the control element. It is also undesirable that traffic occupancy information be disseminated across the network when the propagation delay is significant. The traffic must, however, be routed on the basis of link functional availability and link functional changes must be reported network-wide. These functional changes may include capacity extension of a link and the addition of new nodes and links.

One method used widely to disseminate network state information is called "flooding", in which each node distributes link state change information to each neighbouring node. Flooding may lead to excessive transfer of redundant information. Although the information redundancy may be reduced to some extent by using a hierarchical structure for the purpose of information dissemination and routing decisions, flooding becomes awkward when the number of links per node increases. Advances in switching technology now enable the construction of large scale routers/switches with high capacity, of the order of terabits per second each, and with a large number, exceeding one hundred for example, of links. In a network deploying such nodes, an alternative to flooding is highly desirable.

Performing routing table computations in response to every link state change limits the scalability of a network. Introducing routing changes on the basis of functional network state changes must be controlled in order to avoid performing unnecessary computation for routes which are not affected by node functional state changes.

A scheme of network state monitoring and information dissemination which eliminates uncontrolled redundancy and simplifies the control protocols is desirable in order to enable network growth.

Routing traffic between a source node and a sink node in a telecommunications network can be realized using several techniques which have been extensively reported in the literature. The methods generally attempt to route traffic through the shortest available route between a source node and a sink node. Some methods, which may be classified as selective routing methods, base the route selection on the static cost of the links, the link states and the link occupancies at the time the routing decisions are made. Main considerations in devising routing methods include the computational effort required to find the favourable route and the volume of signals exchanged among the nodes.

SUMMARY OF THE INVENTION

It is an object of the present invention to develop control methods and apparatus for a large-scale network having numerous nodes.

In accordance with an aspect of the present invention, there is provided a network comprising: a plurality of nodes; links interconnecting the nodes; and a plurality of network controllers, each network controller associated with a set of subtending nodes belonging to the plurality of nodes. Each node of the plurality of nodes is operable to elect a primary network controller from the plurality of network controllers. Each network controller is operable to determine, for each subtending node in the associated set of subtending nodes: a route set to each other subtending node in the associated set of subtending nodes; and a route set to at least one subtending node in the set of subtending nodes associated with each other network controller in the plurality of network controllers. At least one of the nodes functions as one of the network controllers.

In accordance with another aspect of the present invention, there is provided, at a controller of a network, a method of disseminating link-state-change information. The network comprises nodes interconnected by directional links. Each node stores a route set to each other node and the controller has an inverse routing table. The method comprises steps of: receiving link-state-change information related to at least one of the directional links; identifying, from the inverse routing table, an affected node, where the affected node stores a route set including at least one route traversing the at least one of the directional links; and sending the link-state-change information to the affected node. If the affected node is associated with another network controller, a step of sending the link-state-change information to the other network controller is executed.

In accordance with a further aspect of the present invention, there is provided a network controller in a network of nodes interconnected by a plurality of directional links. The network controller is operable to: populate an overall routing table comprising a plurality of nodal route sets, one of the nodal route sets corresponding to each of a plurality of directed node pairs, where a directed node pair defines a source node and a sink node; distribute a subset of the plurality of nodal route sets to each node in the network, the subset including each nodal route set for which the each node is the source node; and determine an inverse routing table indicating, for each directional link of the plurality of directional links, at least one affected node for which the subset of nodal route sets includes an affected route that includes the each directional link. The network controller is further operable to: receive state-change information related to a given directional link of the plurality of directional links; determine, from the inverse routing table, a corresponding affected node; and communicate the state-change information to the corresponding affected node.

In accordance with another aspect of the present invention, there is provided, in a network comprising a plurality of network controllers and nodes interconnected by directional links, a node operable to: receive nodal routing sets from one of the network controllers, the nodal routing sets specifying directional links in routes to each other node; receive link-state-change information from the one of the network controllers, the link-state-change information related to at least one of the directional links in at least one of the routes; and adjust the nodal routing set based on the link-state-change information.

In accordance with a further aspect of the present invention, there is provided, in a network comprising nodes interconnected by links, a method of determining a route set from a first node to a second node, the route set including at least two routes, the method comprising : generating a plurality of routes from the first node to the second node; associating a metric with each route in the plurality of routes; and ranking the each route relative to each other route in the plurality of routes in a descending order of preference. A highest-ranking route is associated with an optimum value for the metric and each remaining route is ranked according to a ranking value determined by the metric and an intersection level with at least one other route of a higher rank. The intersection level is determined as a number of common links in the each remaining route and the at least one other route of a higher rank. The method includes a further step of assessing a penalty to the each remaining route according to the intersection level and determining the ranking value as a sum of the metric and the penalty, where the metric is a route cost.

In accordance with a further aspect of the present invention, there is provided a method of recursive ranking of routes from a source node to a destination node in a network comprising a plurality of nodes, wherein each route has an associated cost. The method comprises steps of: labeling all the routes as candidate routes; initializing a ranked route set with a null entry; associating a penalty with each of the candidate routes, where the penalty is initialized to equal zero; determining an intersection level of each of the candidate routes with the ranked route set; increasing the penalty associated with each of the candidate routes by an increment determined according to the intersection level; transferring a candidate route having a least sum of associated cost and associated penalty to the ranked route set; and repeating the determining, increasing, and transferring until a number of routes in the ranked route set reaches a predetermined threshold.

In accordance with a further aspect of the present invention, there is provided, in a network comprising nodes and links interconnecting the nodes, a controller for a given one of the nodes. The controller is operable to: store, in a first associated memory, a route set for at least one other node, the route set including a description of at least one route to the at least one other node; and store, in a second associated memory, an inverse route set associated with at least one link connected to the given one of the nodes, the inverse route set listing each node whose route set includes the at least one link. The controller is further operable to notify at least one node listed in the inverse route set associated with at least one link connected to the given one of the nodes when the at least one link is determined to be inoperative.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention:

FIG. 5 illustrates an overall routing table for the network of FIG. 1.

FIG. 7 illustrates a least cost matrix for the network of FIG. 1.

FIGS. 15A, 15B and 15C illustrate several arrays for use in a method for determining intersection level.

FIGS. 17A and 17B illustrate several arrays whose contents represent interim results of the steps of determining the shortest path from a designated node to each of the other nodes in the network of FIG. 14.

DETAILED DESCRIPTION OF THE PREFERRED EMBODIMENTS

Figure 1:
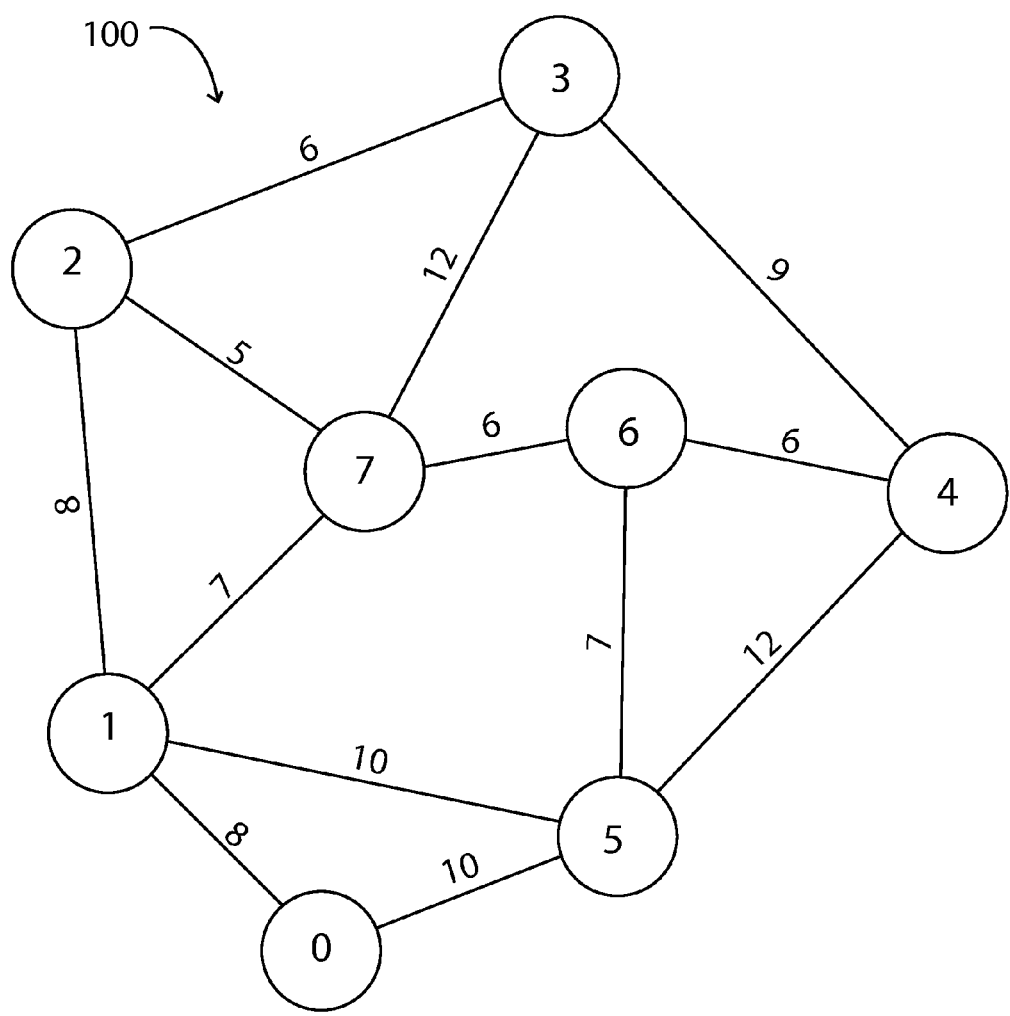
FIG. 1 is a schematic network of nodes representing a communications network.

FIG. 1 models a communication system as a graph 100 of nodes and links between the nodes, each link between a pair of nodes is shown to have an associated metric, in this case, a cost of the link. Each link shown in graph 100 actually represents two unidirectional links, one unidirectional link for each of the opposite directions. The link metrics shown are chosen to be equal in the opposite directions for convenience of presentation. In general, the opposite link metrics need not be equal.

Figure 2:
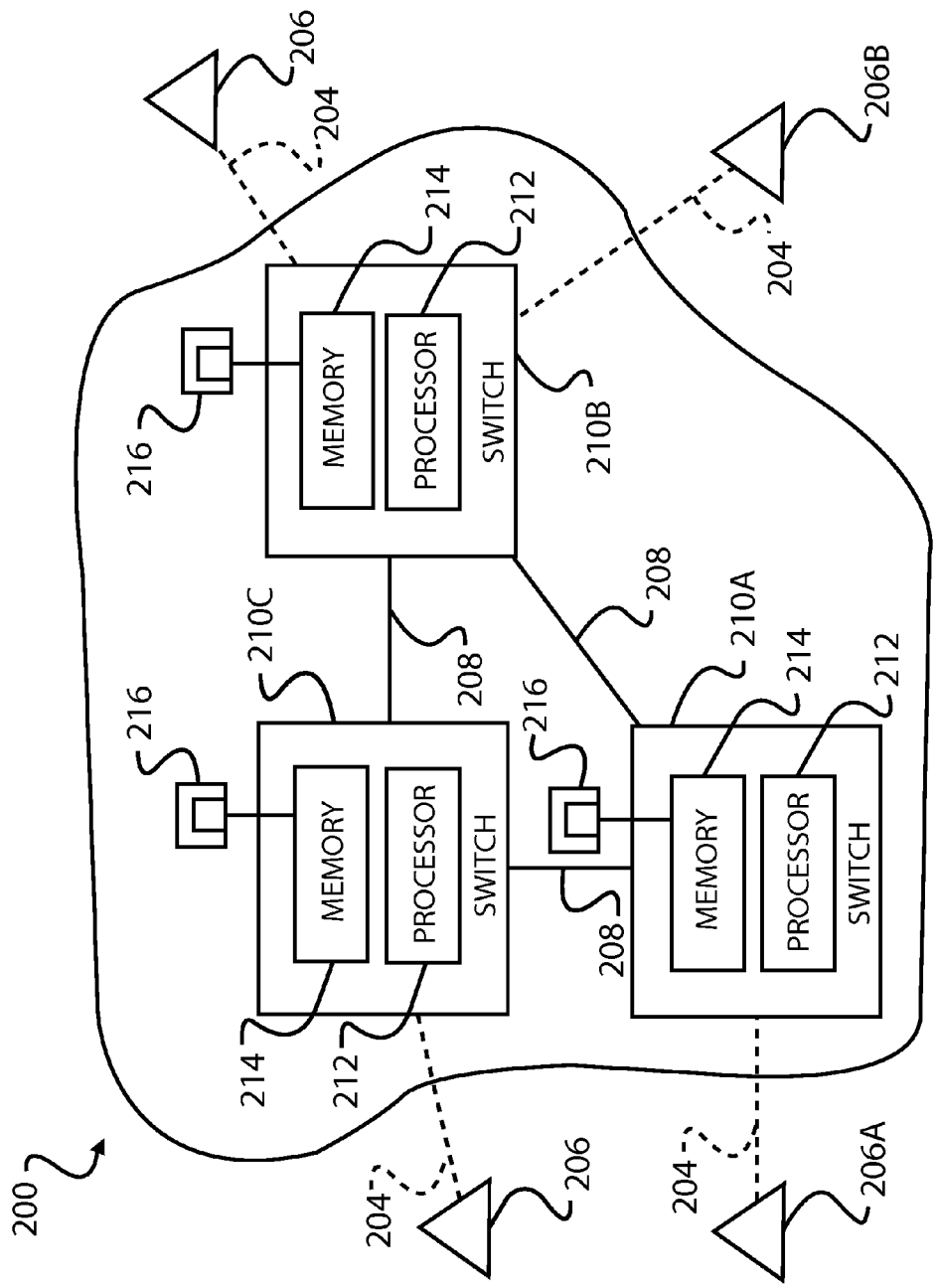
FIG. 2 schematically illustrates a network suitable for use with this invention.

FIG. 2 illustrates a network suitable for use with this invention. Network 200 comprises a number of nodes 210 which are nodes interconnected by links 208. A number of traffic sources and traffic sinks (work stations, servers) 206 are connected to the nodes 210 by local links 204. Each node comprises a processor 212 and a memory 214 loaded with route selection software for executing the method of this invention from software medium 216 which could be a disk, a tape, a chip or a random access memory containing a file downloaded from a remote source.

Figure 3:
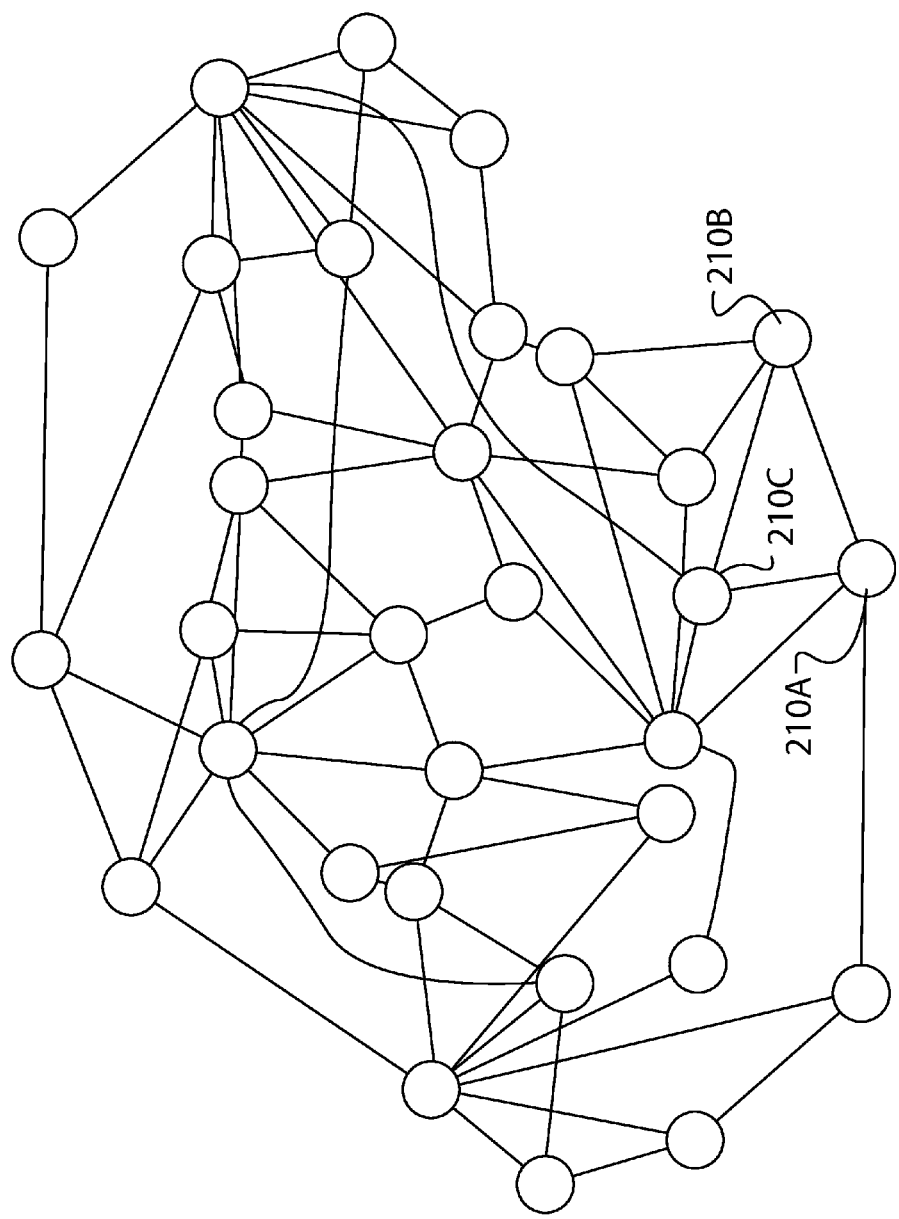
FIG. 3 is a schematic network of nodes representing a communications network.
Figure 4:
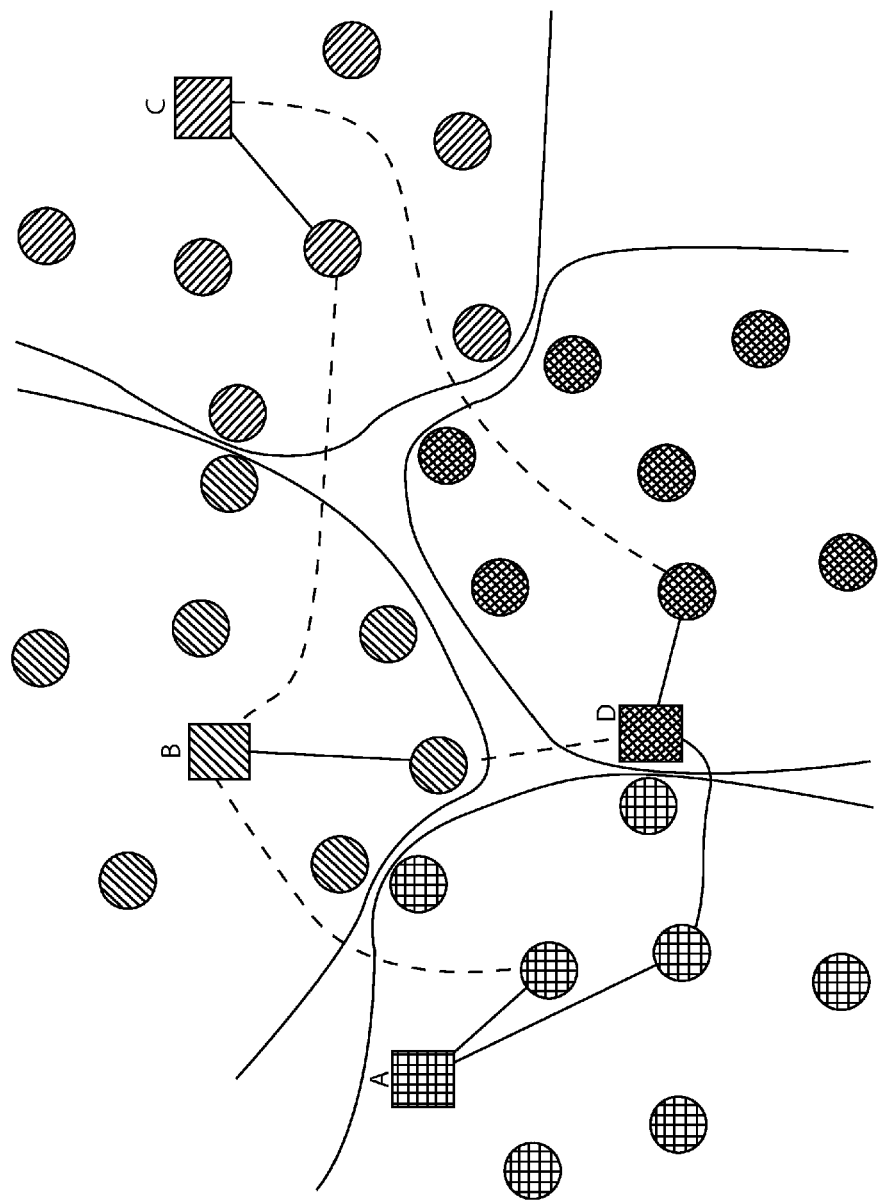
FIG. 4 illustrates the network of FIG. 3 partitioned into domains geographically.

FIG. 3 illustrates a generic network of interconnected nodes 210. Referencing FIG. 4, the generic network of FIG. 3 has been partitioned into domains geographically and each domain has elected one node as a controller. The division of a network into domains with fixed boundaries is known. Controllers are illustrated as lettered boxes. Connections are illustrated for a limited number of nodes. A solid line to a controller is representative of a primary connection whereas a dashed line to a controller is representative of a secondary connection. A node can select any controller as an alternate controller.

It should be noted that the present invention is not concerned with the division of the network into well-defined domains. Preferably, the present invention is employed in a network in which there may be numerous controllers and any node may choose any controller, however a node can not report to more than one controller concurrently.

In overview, a controller populates an overall routing table for its network (or sub-network or domain), where the overall routing table comprises a nodal routing table for each source node, and each nodal routing table comprises a route set for each source-sink node pair for a particular source node. An appropriate nodal routing table is then distributed to each node in the network. If, at a node, a change is perceived in a link state, a signal indicating that change is sent to the controller. The controller receives the link state change information and, under control of software in memory 214 (FIG. 2), undertakes the method of this invention to determine a subset of nodes influenced by the link state change. The controller then indicates the link state change to the determined subset of nodes.

More specifically, an overall routing table is populated by determining a route set for every node pair in the network. When considering a particular node pair, comprising a source node and a sink node, each leading link (link emanating from the source node) is considered. For a given leading link (emanating from the source node), a least cost route from the node at the end of the given leading link to the sink node is determined. The determined route, including the given leading link and the least cost route, becomes part of the route set associated with the node pair.

If the network is large, the size of each route set may be limited. Limitations may be placed on number of routes per route set or routes may qualify for a route set only if a metric (say, cost) associated with the route falls inside an optimum range. For instance; when all routes have been determined, the routes in a route set may be sorted in ascending order by cost. Then a predetermined number of routes may be selected for inclusion in the routing table. Routes may also qualify for a route set only if a particular capacity criteria is met.

An overall routing table 502 for the network of FIG. 1 is illustrated in FIG. 5. Note that source nodes are listed as column headers across the top of the table and sink nodes are listed as row headers along the left side. Where a source node column meets a sink node row may be found a route set for that source-sink node pair. One column of overall routing table 502 comprises a nodal routing table to be associated with a source node, identified at the top of the column. Note that, although most of the node pairs in the example overall routing table 502 have either one or two routes in their route sets, the number of routes in route sets corresponding to particular node pairs may vary considerably. A particular network may have only one route in a route set for one node pair yet have 100 routes in a route set for another node pair.

Figure 6:
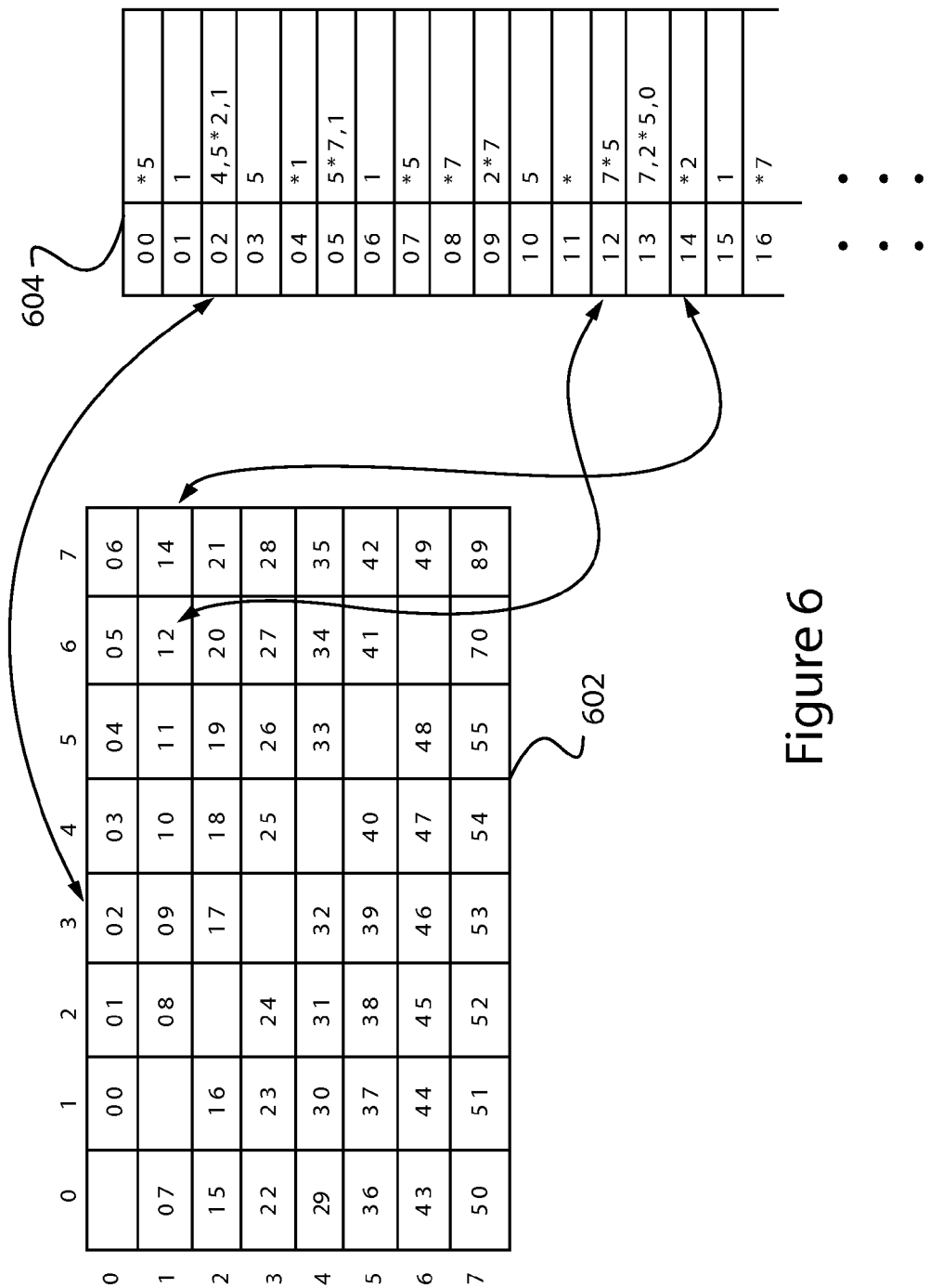
FIG. 6 illustrates an alternative to the routing table of FIG. 5.

Referencing FIG. 6, an alternative to the overall routing table of FIG. 5 is illustrated. Rather than storing route sets directly in an overall routing table, as in overall routing table 502 of FIG. 5, a pointer to a record in a register 604 is stored in an overall routing table 602. Register 604 is made up of records of a predefined length, eight bytes for example. To conserve memory, rather than storing complete routes, only nodes in the route that are intermediate to the source node and sink node are stored in register 604. If there exists a direct link from source to sink, a null entry represents a connection without intermediate nodes. For example, the route set for node pair (3, 0) includes 3-4-5-0 and 3-2-1-0. Overall routing table 602 correlates memory pointer 02 in register 604 with node pair (3,0). Consequently, stored in memory position 02 of register 604 is "4,5" and "2,1" because those are the intermediate nodes. Similarly, the route set for node pair (1, 2) includes "1-2" and "1-7-2" so stored in memory position 15 is a null and "7". A "*" is used in FIG. 6 as a delimiter between routes. Note that, for route sets including a direct link such as for node pair (1, 2), the first entry in the memory position is a delimiter. In a preferred data structure for the register, a sequence of "1"s is used as a delimiter to separate alternate routes. The string of 16 "1"s can not be assigned as a node identifier. The length of the sequence of "1"s is preferably the same number of bits used to identify a node (16 bits).

Since the lengths of route sets may vary significantly from one node pair to another, a route set may be stored in successive records. A route set may take more than one record of register 604, hence the need for pointers. An example of this may be seen for node pair (6, 1), for which a route set of four routes (see FIG. 5) results in pointer 12 being followed by pointer 14.

The step of determining a least cost route (generically, a metric optimised route) from the node at the end of the given leading link to the sink node may be implemented efficiently by pre-determining a least cost matrix (generically, a metric optimised matrix). In such a least cost matrix may be stored a least cost route, and the cost of the least cost route, from every node in the network to every other node in the network. A least cost matrix 702, such as illustrated in FIG. 7 for the network of FIG. 1, may then be used to determine a least cost route from the node at the end of the given link to the sink node.

Once a controller has populated an overall routing table for the network for which it is responsible, each nodal routing table is distributed to its respective source node in the network.

Recall that typical link state information dissemination methods rely on flooding to report link state changes, where link state changes include both failure and recovery of a node or link. Each node may then recompute a nodal routing table which takes into account the link state changes. The present invention requires that each node monitor its links from neighbouring nodes and report link state information to at least one controller. The controller then determines which nodes are affected by the received link state information and indicates to the affected nodes a temporary change to the previously distributed nodal routing table. By doing so, the computational effort required to update the network control tables at each node is minimised. Alternatively, a controller may distribute to each of its affected subtending nodes the part of the link state information that each affected subtending node needs to alter its route sets.

In a network of wide coverage, several controllers may be used, each node may report to the nearest accessible controller, hereafter referenced as the primary controller of the node, with the option to switch to any other controller in case of lost communication with its primary controller. The controller of a node after switching away from the primary controller may be called the current controller.

Each node transmits periodic signals, or "heartbeats", to neighbouring nodes via each of its outgoing links. Nodes receive these periodic (say, every 10 milliseconds) signals from each neighbouring node and recognise their receipt as indication that the respective links are operational. If a heartbeat from a given node is not received by a waiting node in a predetermined period of time, a "time out" may be generated. Successive time outs may be understood as a link state change and reported, by the waiting node, to the current controller of the waiting node. Nodes report only link state changes. While it may be desirable that a node failure be reported to a controller, node failure is indistinguishable from failure of all outgoing links of a node.

Figure 8:
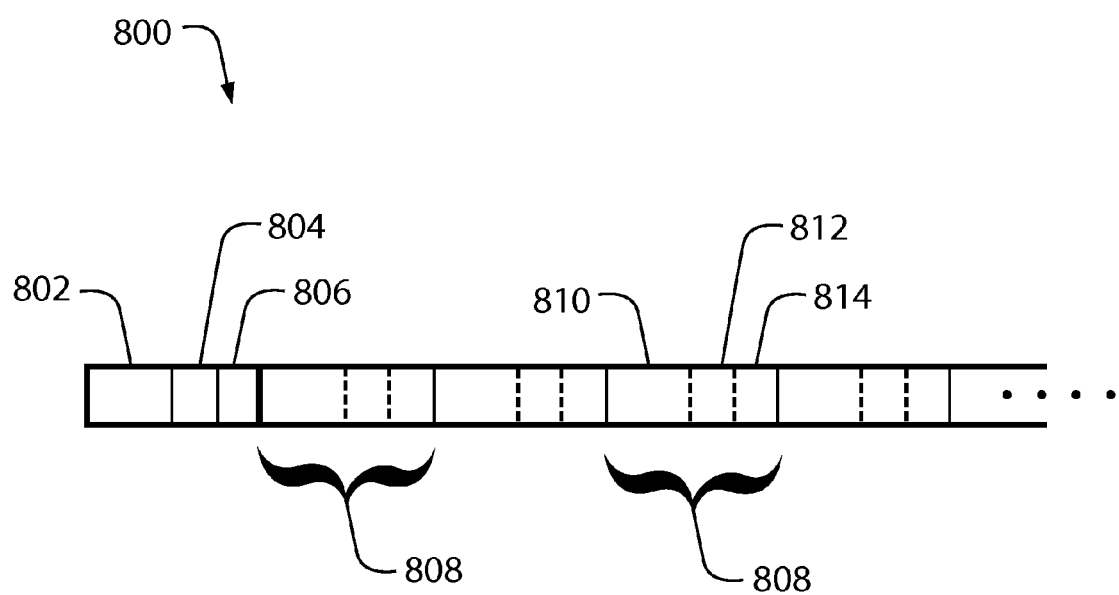
FIG. 8 illustrates a format for a type-1 message in an embodiment of the present invention.

FIG. 8 illustrates a format for a type-1 message 800, formed by a node and sent to its current controller to inform the current controller about the state of its links from neighbouring nodes. Message 800 is of variable length with a minimum of three fields. First field 802 contains the reporting (link sink) node identifier and is typically two bytes long. Second field 804 is a cyclic message sequential number and is typically one byte long. Third field 806 contains the number of link state changes. The number of changes reported per message is preferably limited to 255, thus the length of the third field is preferably one byte. In a well designed network, the number of reported link state changes would often be zero and is unlikely to exceed one. However, if a node has a very large number of links (several thousand, for example) and more than 255 incoming links are perceived to be entering a failure state, or recovering from failure, the link states can be reported to the current controller in consecutive type-1 messages 800. Each link state change of a neighbouring (link source) node is reported in a segment 808. First field 810 of segment 808 contains the neighbouring node identifier and is preferably two bytes long. Second field 812 of segment 808 is a link state sequence number, preferably with a length of four bits. Third field 814 of segment 808 contains a two bit state change code. The link state sequence number is generated by the reporting node to indicate to a controller receiving the link state changes the order in which the changes were reported. This sequence number is specific to a particular link.

A state change code of 01, in field 814, indicates that a link from the neighbouring node identified in field 810 has changed from operational to non-operational. A state change code of 10 indicates that a link from the neighbouring node identified in field 810 has changed from non-operational to operational. A node need not report continuation of unchanged link states. For example a state change code of 00, indicating that a link from a respective neighbouring node was operational in the preceding report and is still operational, or a code 11 indicating that a link previously reported as in a non-operational state is perceived to be still non-operational, would not be reported. The latter code, 11, may, however, be useful, this is why two bits are used in field 814 instead of one bit.

A type-1 message 800 is sent by each node to its current controller even when all incoming links to the node are operational. Once message 800 is sent to a controller, an acknowledgement is anticipated. If an acknowledgement is not received from the primary controller within a time limit, message 800 is sent to a secondary controller. A controller need not take any action if it does not receive type-1 messages 800 from a node, other than to delete the node from the controller's list of subtending nodes. If the absence of a type-1 message is due to a node failure, the problem will be reported by the adjacent nodes of the failed node. If the absence of a type-1 message is due to a link failure, the sending node will not receive an acknowledgement and hence it will seek another controller. Reverting to the primary network controller upon recovery is optional.

Figure 9:
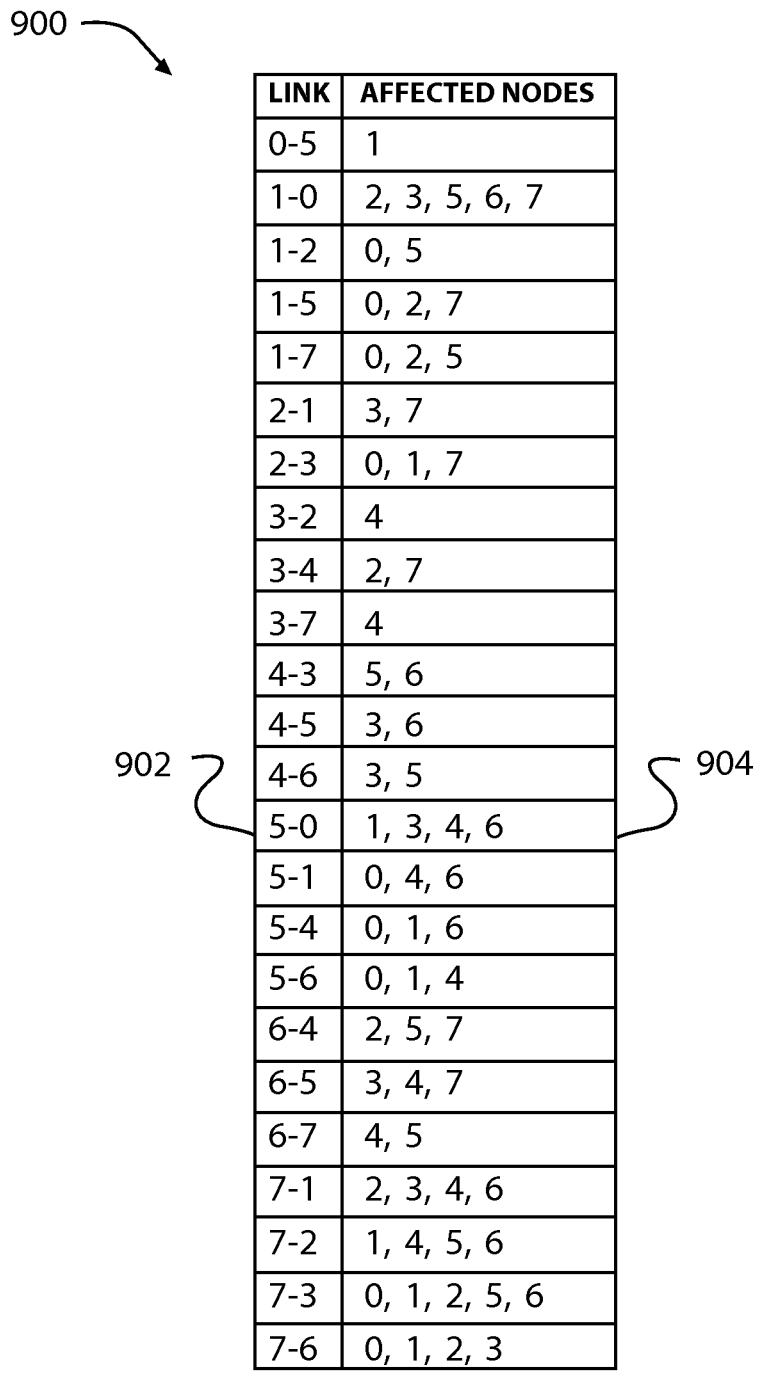
FIG. 9 illustrates an inversion of the routing table of FIG. 5.

In order to determine which nodes are affected by received link state information a controller may make use of an inversion of the overall routing table. An example inversion of the overall routing table of FIG. 5 is illustrated in FIG. 9. The table 900 relates a link 902 to a set of nodes 904 that are affected by a change in the state of that link. For example, link 5-0 is included in the nodal routing table of nodes 1 (1-5-0), 3 (3-4-5-0), 4 (4-5-0) and 6 (6-5-0). The set of nodes 904 exclude the end nodes of a corresponding link 902 since such information is redundant.

Figure 10:
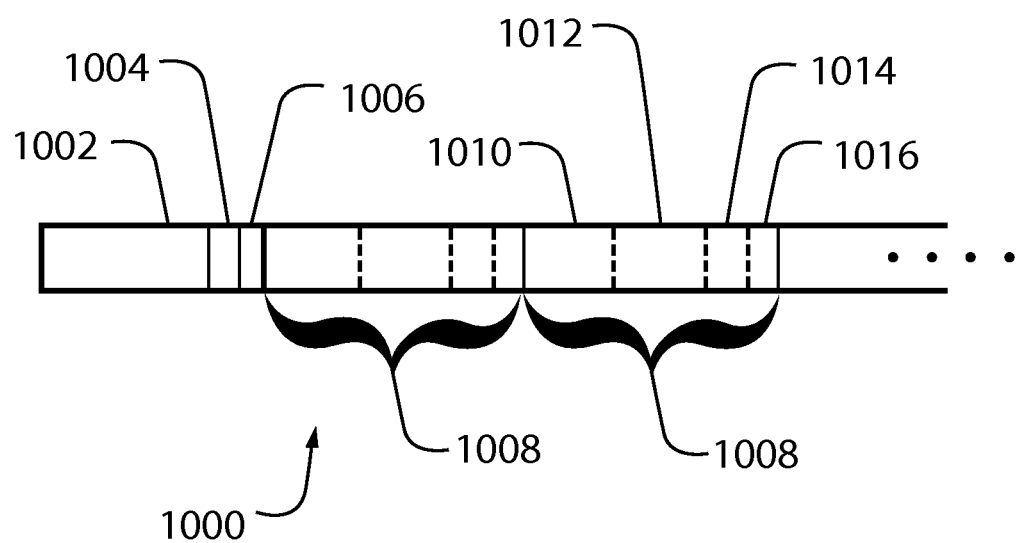
FIG. 10 illustrates a format for a type-2 message in an embodiment of the present invention.

A type-2 message is used by the controller to indicate a link state change to affected nodes. FIG. 10 illustrates a format for a type-2 message 1000, formed by a controller and sent to nodes affected by a particular link state change. The first field 1002 of message 1000 contains the controller node identifier and is typically two bytes long. Second field 1004 is a cyclic message sequential number and is typically one byte long. Third field 1006 contains the number of link state changes. The number of changes reported per message is preferably limited to 255, thus the length of the third field is preferably one byte. In a well designed network, the number of reported link state changes would often be zero and is unlikely to exceed one. As in type-1 messages 800, consecutive messages may be used to indicated more than 255 link state changes. Each link state change is reported in a segment 1008. First field 1010 contains the link source node identifier for the reported link and is preferably two bytes long. Second field 1012 contains an identifier for the link sink node for the reported link and is preferably two bytes long. Third field 1014 is a link state sequence number, preferably with a length of four bits while fourth field 1016 contains a two bit state change code. The link state sequence number is generated by the reporting node to indicate to an affected node receiving the link state changes the order in which the changes were reported.

Figure 11:
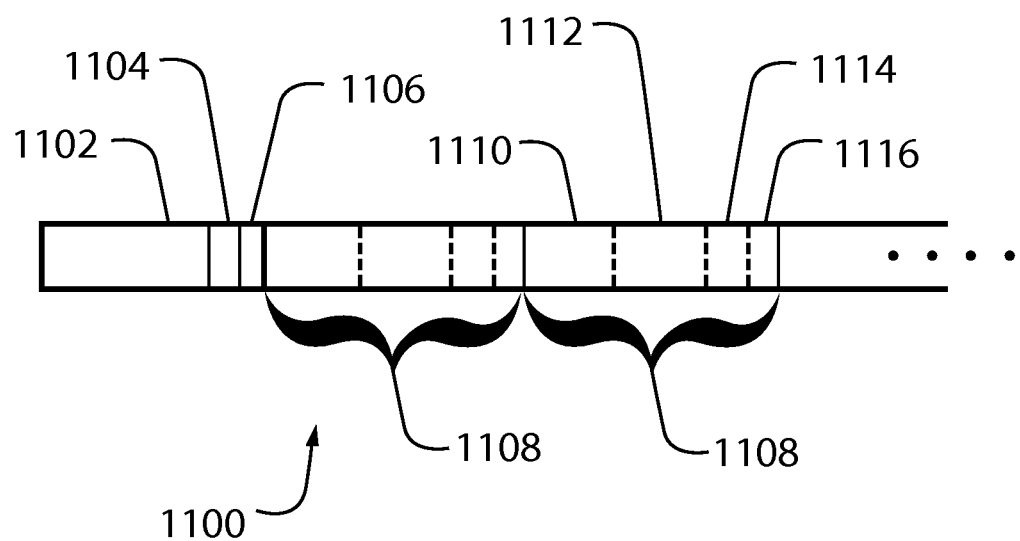
FIG. 11 illustrates a format for a type-3 message in an embodiment of the present invention.

A type-3 message is used by a controller to indicate a link state change to other controllers. FIG. 11 illustrates a format of a type-3 message 1100. The message begins with three fields: 1102; 1104; and 1106. Field 1102 contains a reporting controller identifier and is typically two bytes long. Field 1104 is a message sequential number and is typically one byte long. Field 1106 contains the number of reported link state changes for directional links terminating on the nodes subtending to the controller. This number is preferably limited to 255 and link state changes exceeding this number are reported in subsequent messages. There is a segment 1108 for each reported link state change. Segment 1108 has four fields 1110, 1112, 1114 and 1116. Field 1110 contains the link source node identifier for the reported link and is preferably two bytes long. Field 1112 contains an identifier for the link sink node for the reported link and is typically two bytes long. Field 1114 is a link state sequence number and is typically four bits long. The link state sequence number is generated by the reporting node to indicate to a controller receiving the link state changes the order in which the changes were reported. Field 1116 is two bits long and contains the state change of the link defined by the link source node identified in field 1110 and the link sink node identified in field 1112. Note that a controller sends type-3 messages of different content to different controllers.

Although one bit would suffice for field 1116 of FIG. 11 (and field 814 of FIG. 8 and field 1016 of FIG. 10), two bits are used for possible future reporting of all the four states 00, 01, 10 and 11. Note that such reporting would only relate to links which have experienced a failure and have not yet recovered.

Note that both controller originated messages, type-2 and type-3, contain the same information but are intended for a different destination, a node in the case of a type-2 message and another controller in the case of a type-3 message.

Figure 12:
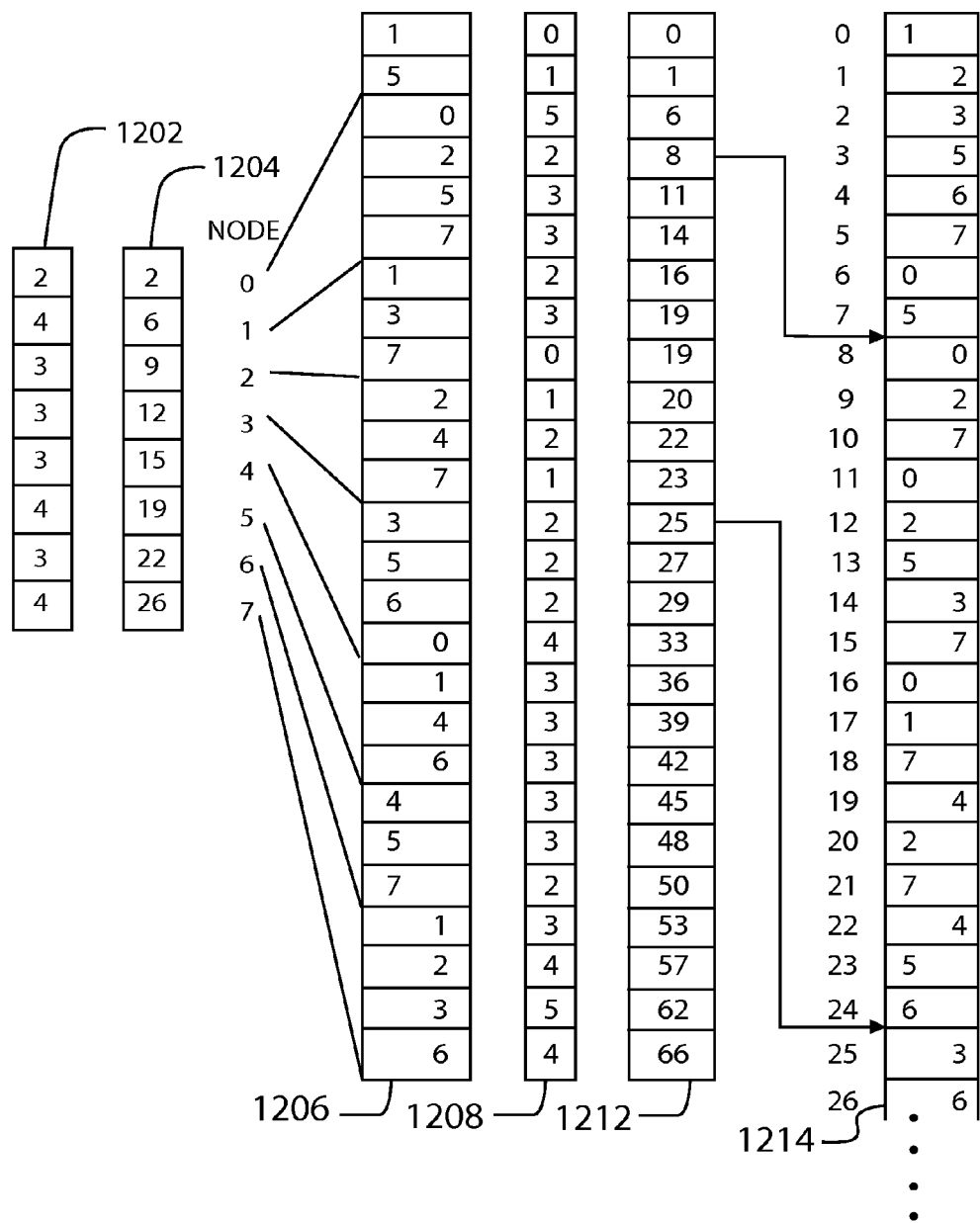
FIG. 12 illustrates a data structure used for ease of retrieval of the nodes associated with each link in the network of FIG. 1 in an embodiment of the present invention.

It will be recalled that FIG. 9 presented the nodes affected by a link. FIG. 12 illustrates a data structure used for ease of retrieval of the nodes affected by each link. An array 1202 has N entries, where N is the number of nodes, and stores the number of links emanating from each node. Array 1202 is converted into a cumulative array 1204 which is used as a pointer to an array 1206. Array 1206 stores the identity of the links emanating from each node. If the number of links emanating from a node is large, of the order of one hundred, say, the links may be stored in order (either ascending or descending) to facilitate searching. For each entry in array 1206, a corresponding entry in an array 1208 gives the number of affected nodes. Array 1208 is converted into a cumulative array 1212 which serves as a pointer to an array 1214. Array 1214 stores the identities of the nodes affected by each link in array 1206. For example, when determining the nodes affected by link 1-2, consider that entry 0 in array 1204 points to location 2 in array 1206 and entry 1 in array 1204 points to location 6 in array 1206. From this information, a determination may be made that the links emanating from node 1 are stored in locations 2 to location 5 in array 1206, namely links to nodes 0, 2, 5 and 7. The link of interest is 1-2 identified in location 3 in array 1206. The corresponding entry in array 1208 is 2 and in array 1212 is 8. The relevant nodes of link 1-2 are therefore stored in locations 6 and 7 of array 1214, namely nodes 0 and 5. Therefore, nodes 0 and 5 are affected by changes in the state of link 1-2.

Figure 13:
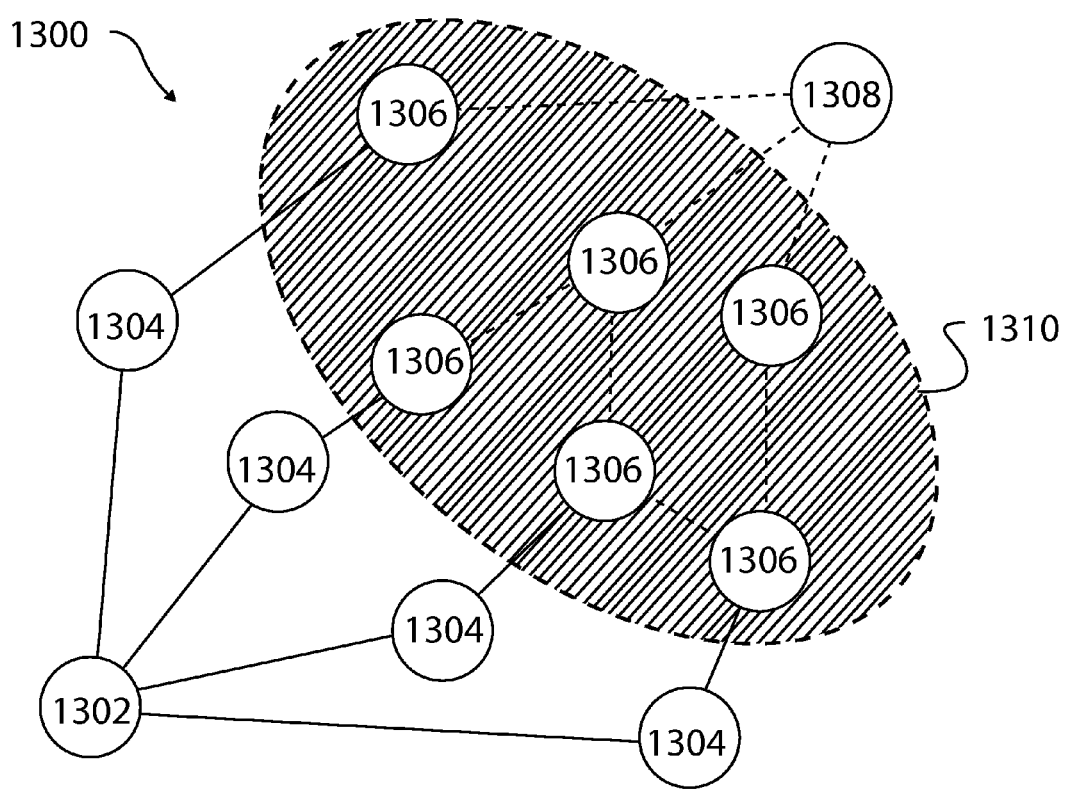
FIG. 13 illustrates a network wherein a practice of selecting a route set with different leading links is emphasised.

FIG. 13 illustrates a network 1300 wherein a practice of selecting a route set with different leading links is emphasised. At a source node 1302, the cost is determined from node 1302 to a sink node 1308 whereby the cost from node 1302 to each neighbouring node 1304 is added to the least cost from each neighbouring node 1304, through a network 1310 of intermediate nodes 1306, to sink node 1308. This practice yields a number of routes from source node 1302 to sink node 1308 equal to the number of links emanating from source node 1302. The set of routes thus obtained may be sorted according to cost and a predetermined number of routes may be selected for inclusion in the route set. The order of preference of the routes in the route set may be changed according to other criteria, such as an intersection level penalty, as will be described below.

An intersection level penalty may be assessed to a route. The penalty is assessed to take into account the situation wherein a particular route shares a link with another, more preferable, route in the same route set. Turning to network 1400 of FIG. 14, there are four candidate routes in a route set for node pair (A, B), as there are four links emanating from node A, namely A-P, A-C, A-G and A-D. Consulting a predetermined matrix, the optimal (least cost) route to node B and cost of that route may be determined for nodes P, C, G and D. Using a notation wherein routes are listed with the total cost along the route as {route, cost}, the candidate routes to B from nodes P, C, G and D may be listed as {P-E-B, 15}, {C-F-B, 11}, {G-F-B, 9} and {D-G-F-B, 16} respectively. The route set is then sorted according to cost to result in

1. {A-C-F-B, 18}
2. {A-G-F-B, 19}
3. {A-P-E-B, 23}
4. {A-D-G-F-B, 24}.

Route A-C-F-B is the minimum cost route and, as such, is added to a ranked route set. Naturally the ranked route set will have been created with a null entry before the above route addition step.

Each remaining candidate route is assessed a penalty with regard to the ranked route set, thus far only including route A-C-F-B. Route A-G-F-B intersects with route A-C-F-B in link F-B. As such, the intersection level of route A-G-F-B is one and the route may be assessed a penalty. The value of the penalty is arbitrary, but consistent for a given network. In this case the penalty is five units and the cost of route A-G-F-B is artificially increased to 24 units. Route A-P-E-B does not intersect with route A-C-F-B, hence is not penalised. Route A-D-G-F-B intersects with route A-C-F-B in link F-B giving an intersection level of one and a penalty adjusted cost of 29. The remaining candidate routes are then sorted according to the adjusted cost to give

1. {A-P-E-B, 23}
2. {A-G-F-B, 24}
3. {A-D-G-F-B, 29}.

Route A-P-E-B is the minimum cost route of these candidates and, as such, is added to the ranked route set. Thus, the ranking of route A-P-E-B changes from three to two.

Each route not yet in the ranked route set is then assessed a penalty with regard to the second member of the ranked route set. As neither A-G-F-B nor A-D-G-F-B intersect with A-P-E-B, both intersection levels remain at one. The candidate routes are sorted according to the adjusted cost to give:

1. {A-G-F-B, 24}
2. {A-D-G-F-B, 29}.

Route A-G-F-B is the minimum cost route of these candidates and, as such, is added to the ranked route set.

Finally, route A-D-G-F-B is then assessed a penalty with respect to the ranked route set. Route A-D-G-F-B intersects with the route A-G-F-B in link G-F, increasing the intersection level of route A-D-G-F-B to two. The cost of route A-D-G-F-B is increased from its initial value by twice the penalty of five units, yielding an adjusted cost of 34 units, and route A-D-G-F-B is added to the ranked route set. Note, however, that route A-D-G-F-B, as the last candidate route, may be added to the ranked route set without having a second penalty assessed.

The routes in the ranked route set for node pair (A, B), listed according to the adjusted cost, are then {A-C-F-B, 18}, {A-P-E-B, 23}, {A-G-F-B, 24} and {A-D-G-F-B, 34}. Note that if the ranked route set is limited by routes costing less than, say, 30 units, route A-D-G-F-B may be disqualified from the ranked route set for node pair (A, B) due to the intersection level penalty. Alternatively, the ranked route set may be limited by number of routes. If the ranked route set is limited to two routes, then both route A-G-F-B and route A-D-G-F-B may be disqualified from the ranked route set for node pair (A, B). One can construct several examples where the ranked set is quite different from the original set.

Figure 14:
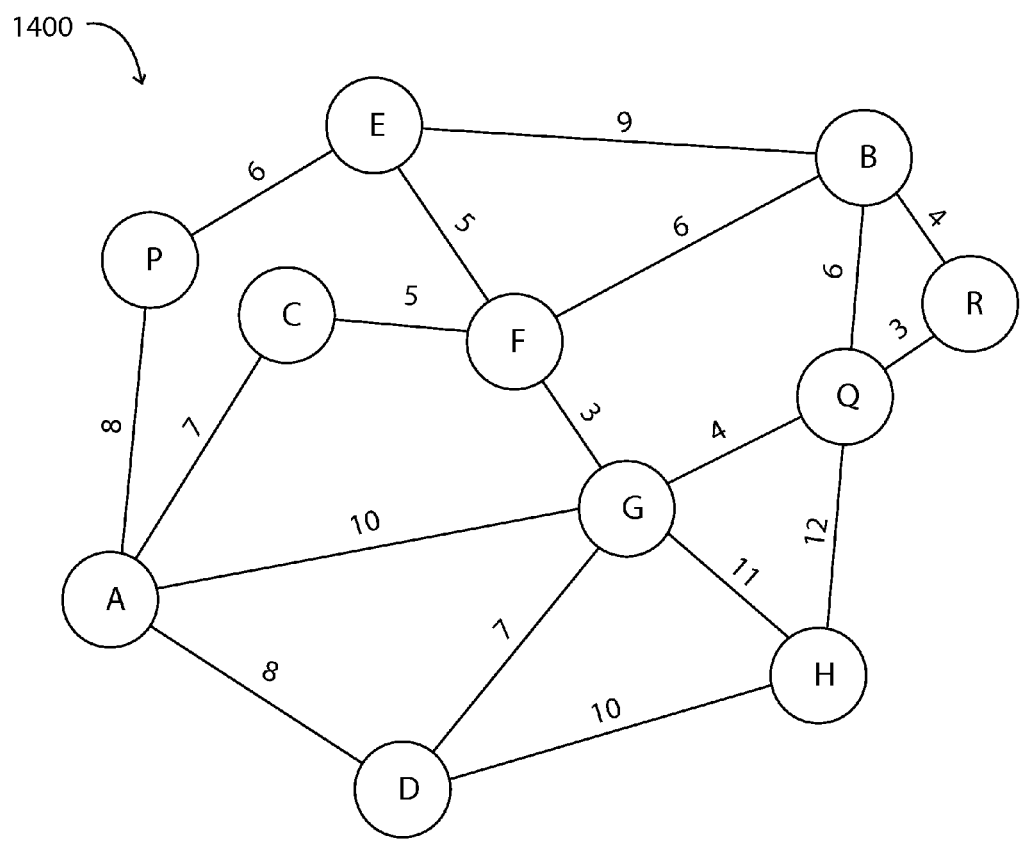
FIG. 14 is a schematic network of nodes representing a communications network.

A method for determining intersection level may be described with reference to FIG. 15A. For a particular stage in the method, array 1502A is used to store a "next node" in a particular route from source to sink while array 1504A stores the number of links remaining between the sink and the node in the corresponding slot of array 1502A. Both arrays are initialized to contain nulls. The node pair in question for this example is (A, R) from network 1400 (FIG. 14). There are four candidate routes for node pair (A, R) as there are four links emanating from node A, namely A-P, A-C, A-G and A-D. Consulting a predetermined matrix (of the type described in conjunction with FIG. 7), the optimal route to node R and cost of that route may be determined for nodes P, C, G and D as {P-E-B-R, 19}, {C-F-B-R, 15}, {G-Q-R, 7} and {D-G-Q-R, 14} respectively. The candidate routes are then ranked according to cost to result in

1. {A-G-Q-R, 17}
2. {A-D-G-Q-R, 22}
3. {A-C-F-B-R, 22}
4. {A-P-E-B-R, 27}.

Using the above ranking, route A-G-Q-R is added to a, previously null, ranked route set.

Because the first link of each route is different, there is no need for it to be included in determining intersections. The second link of route A-G-Q-R, then, is the first to be considered in stage 1A. The link G-Q is represented by entering Q in the G column of array 1502A. In the G column of array 1504A, 2 is entered, as there are two links between node G and node R. The third link in route A-G-Q-R, Q-R, is represented by the entry of R in column Q of array 1502A and the corresponding entry of 1 in array 1504A. There is no array 1502A entry for node R as there is no "next node" but a 0 is entered in array 1504A as there are no links between R and itself. It should be apparent that the intersection level of the first route in a route set is always 0.

To determine the intersection level of subsequent routes, the information in the arrays from prior routes is retained and the arrays are further filled in, in the manner described above, until a column is reached that has an entry in array 1504A other than a null. The value of that entry is then the intersection level of the route in question. Link D-G of route A-D-G-Q-R is the first to be considered in stage 2A. In the D column of array 1502A is entered G while 3 is entered in the corresponding column of array 1504A, since there are three remaining links in the route. Next, link G-Q is considered. Turning to column G, an existing entry, 2, is found in array 1504A. Therefore, arrays 1502A and 1504A are not modified by new information, but the intersection level of route A-D-G-Q-R is set at 2 and there is no need to consider further links in the route (i.e., link Q-R).

Link C-F of route A-C-F-B-R is the first to be considered in stage 3A. In the C column of array 1502A is entered F while 3 (the number of remaining links in the route) is entered in the corresponding column of array 1504A. For link F-B, in the F column of array 1502A is entered B while 2 is entered in the corresponding column of array 1504A. For link B-R, in the B column of array 1502A is entered R while 1 is entered in the corresponding column of array 1504k Turning to column R, an existing entry, 0, is found in array 1504A. Therefore, the intersection level of route A-C-F-B-R, with the ranked route set, is 0.

Link P-E of route A-P-E-B-R is the first to be considered in stage 4A. In the P column of array 1502A is entered E while 3 is entered in the corresponding column of array 1504A. For link E-B, in the E column of array 1502A is entered B while 2 is entered in the corresponding column of array 1504A. For link B-R, in the B column of array 1502A is entered R while 1 is entered in the corresponding column of array 1504A. Turning to column R, an existing entry, 0, is found in array 1504A. Therefore, the intersection level of route A-C-F-B-R, with the ranked route set, is 0.

At the end of stage 4A, then, the intersection level (with the ranked route set comprising only route A-G-Q-R) of route A-D-G-Q-R is 2, while for routes A-C-F-B-R and A-P-E-B-R it is 0. An intersection level penalty is then assessed, and the candidate routes are ranked to result in

1. {A-C-F-B-R, 22}
2. {A-P-E-B-R, 27}
3. {A-D-G-Q-R, 32}.

Route A-C-F-B-R is then added to the ranked route set.

Turning to FIG. 15B, the intersection level of the two remaining candidate routes is assessed against the newest addition to the ranked route set, to determine if further penalties should be added. Stage 1B begins with consideration of link C-F of route A-C-F-B-R. In the C column of array 1502B is entered F while 3 is entered in the corresponding column of array 1504B. For link F-B, in the F column of array 1502B is entered B while 2 is entered in the corresponding column of array 1504B. For link B-R, in the B column of array 1502B in entered R while 1 is entered in the corresponding column of array 1504B. Turning to column R, an entry, 0, is entered in array 1504B.

Link D-G of route A-D-G-Q-R is the first to be considered in stage 2B. In the D column of array 1502B is entered G while 3 is entered in the corresponding column of array 1504B. Next, link G-Q is considered. Turning to column G, a 2 is entered in array 1504B. Subsequently, in column Q an R is entered in array 1502B and a 1 in array 1504B. Found in column R, array 1504B is a 0, so the intersection level of route A-D-G-Q-R with the newest addition to the ranked route set is 0. The intersection level with the entire ranked route set, however, remains at 2.

Link P-E of route A-P-E-B-R is the first to be considered in stage 3B. In the P column of array 1502B is entered E while 3 is entered in the corresponding column of array 1504B. For link E-B, in the E column of array 15026 is entered B while 2 is entered in the corresponding column of array 15048. For link B-R, turning to column B, an existing entry, 1, is found in array 1504B. Therefore, the intersection level of route A-P-E-B-R, with the newest addition to the ranked route set, is 1.

At the end of stage 3B, then, the intersection level (with the ranked route set comprising routes A-G-Q-R and A-C-F-B-R) of route A-D-G-Q-R is 2, while for route A-P-E-B-R it is 1. An intersection level penalty is then assessed, and the candidate routes are ranked to result in

1. {A-P-E-B-R, 32}
2. {A-D-G-Q-R, 32}.

Route A-P-E-B-R is then added to the ranked route set. Route A-P-E-B-R is ranked higher than route A-D-G-Q-R by virtue of a lesser intersection level.

As there is only one candidate route (A-D-G-Q-R) remaining to consider, the place of that route in the ranked route set has been determined and it may then be added. However, if it was necessary to consider intersection level of route A-D-G-Q-R with regard to the recent addition to the ranked route set, such a consideration may be accomplished in view FIG. 15C.

Link P-E of route A-P-E-B-R is the first to be considered in stage 1C. In the P column of array 1502C is entered E while 3 is entered in the corresponding column of array 1504C. For link E-B, in the E column of array 1502C is entered B while 2 is entered in the corresponding column of array 1504C. For link B-R, R is entered in column B, array 1502C while 1 is entered in array 1504C. In column R of array 1504C a 0 is entered.

Link D-G of route A-D-G-Q-R is the first to be considered in stage 2C. In the D column of array 1502C is entered G while 3 is entered in the corresponding column of array 1504C. Next, link G-Q is considered. Turning to column G, a 2 is entered in array 1604C. Subsequently, in column Q an R is entered in array 1502C and a 1 in array 1504C. Found in column R, array 1504C is a 0, so the intersection level of route A-D-G-Q-R with the newest addition to the ranked route set is 0. The intersection level with the entire ranked route set, however, remains at 2.

Figure 17A:
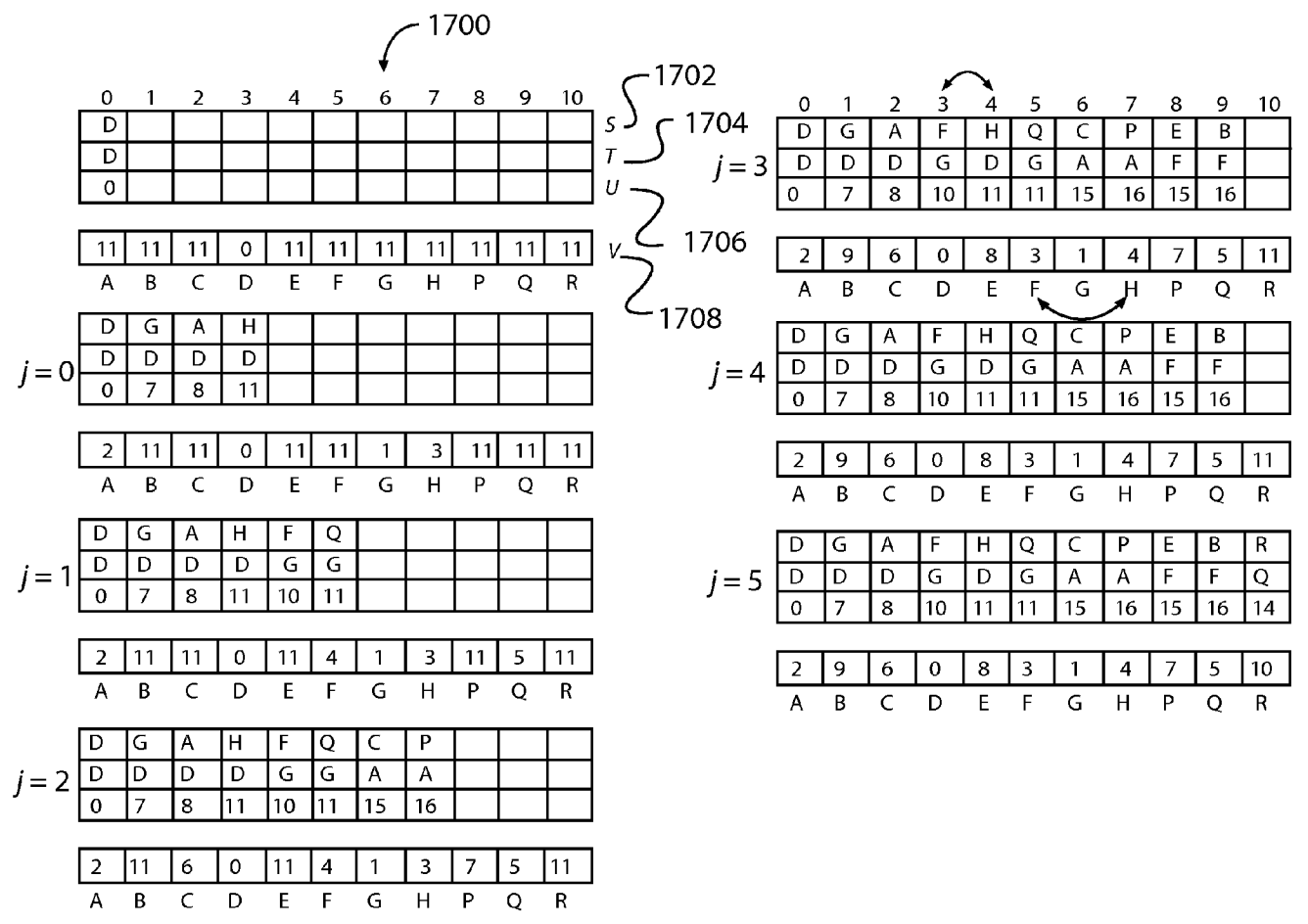
Figure 17B:
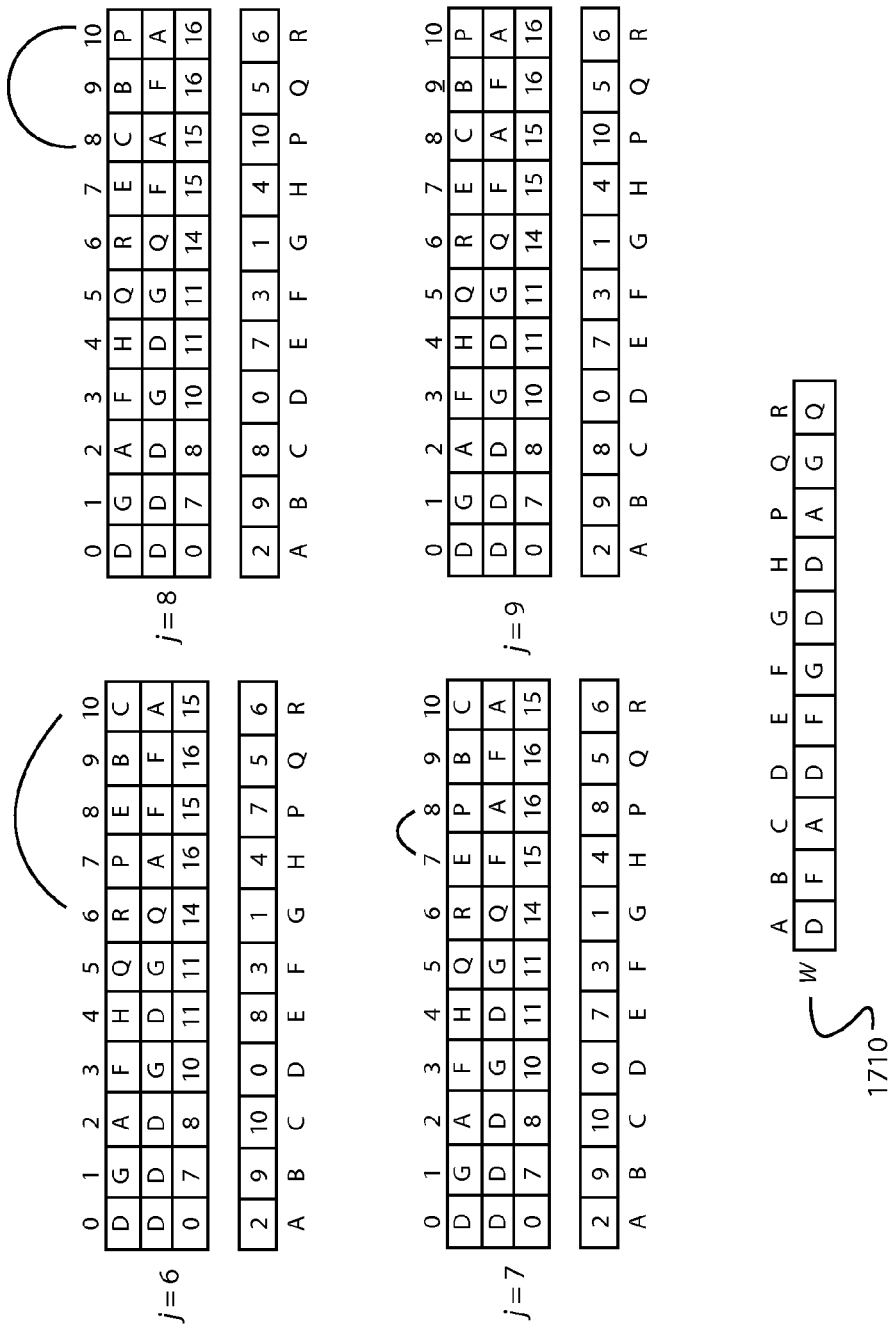
Figure 18:
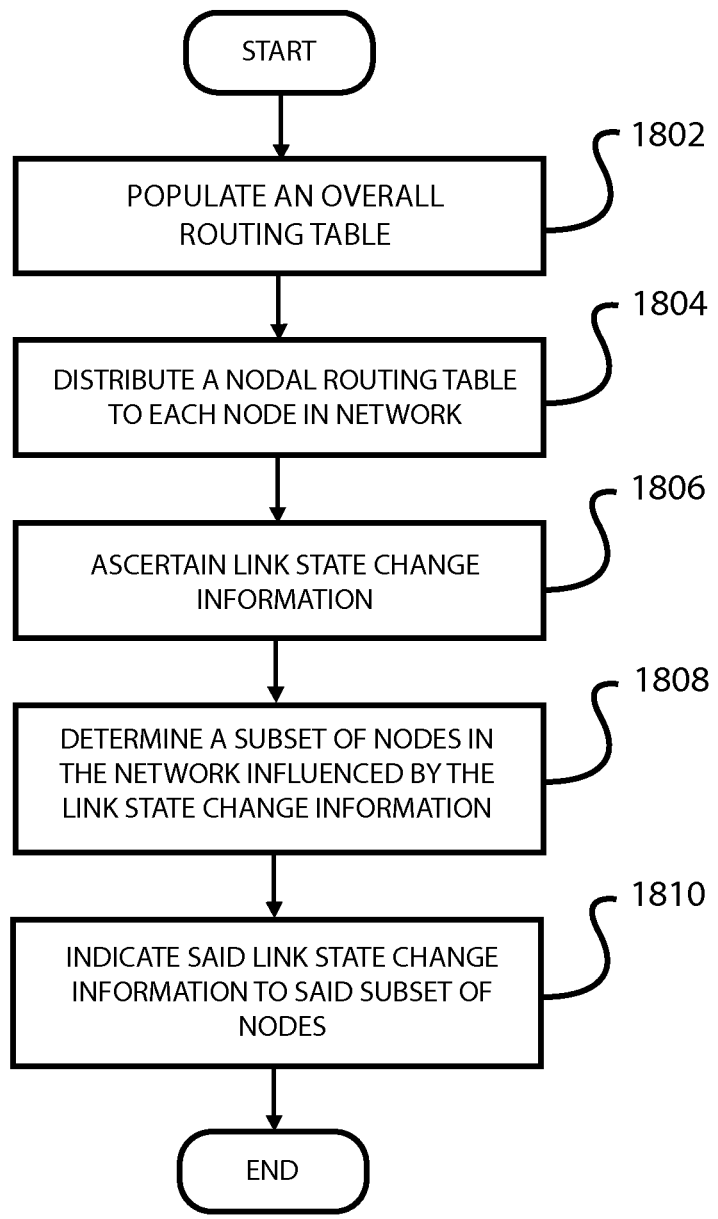
FIG. 18 illustrates the steps followed by a controller in an embodiment of the present invention.

In review, consider FIG. 18, illustrating the steps taken by a network controller. An overall routing table (such as overall routing table 502 of FIG. 5) for a network under control of the network controller is first populated (step 1802). The overall routing table may be populated using routes determined using the method outlined hereinafter in conjunction with FIG. 17 (comprising FIGS. 17A and 17B) and taking into account intersection penalties determined with regard to the arrays of FIG. 15. Subsequently, a nodal routing table is distributed to each node in the network (step 1804). At some later time, link state change information is ascertained (step 1806) for example through receipt of a type-1 message 800 (FIG. 8) from a node indicating a state change of a link from a neighbouring node. A subset of nodes which are affected by the link state change information is determined (step 1808), perhaps through use of an inverted overall routing table (such as inverted overall routing table 900 of FIG. 9). The link state change information is then indicated to each affected node (step 1810) through the use of type-2 messages 1000 (FIG. 10).

Figure 19:
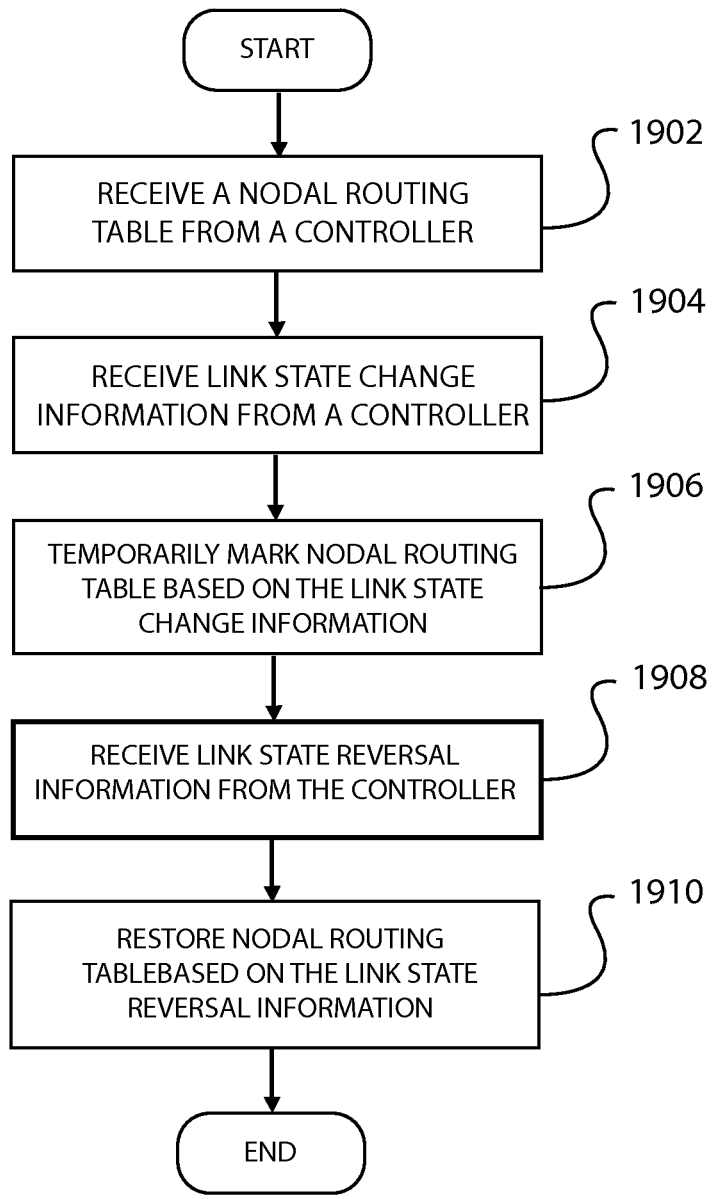
FIG. 19 illustrates the steps undertaken by a node in an embodiment of the present invention.

Further, consider FIG. 19, which illustrates steps undertaken by a node in communication with a controller. Initially, a node receives a nodal routing table from the current controller (step 1902). Subsequently, the node receives link state change information from the controller (step 1904). In response to the link state change information, the node temporarily alters (by tagging or marking routes having failed links) the nodal routing table (step 1906), based on the link state change information. At a later time, link state change information is received from the controller (step 1908) which reverses the earlier change and the node restores the nodal routing table (step 1910) to the state it was in prior to the receipt of the link state change information.

Typically, an algorithm is used to generate the overall routing table of FIG. 5. One such algorithm is the Dijkstra algorithm and an implementation (one of many possible) follows. Dijkstra's algorithm, which was developed by Edsger Dijkstra in 1959, is a well known method described in, for example, C. Papadimitriou, K. Steiglitz, (1982), *Combinatorial Optimization: Algorithms and Complexity*, Prentice-Hall, the contents of which are incorporated herein by reference. Using the algorithm, finding the shortest (i.e., the route which minimises a metric) route for travelling from a given vertex on a graph to every other vertex is possible. Dijkstra's algorithm takes a graph with links, each weighted with a metric, and a given root vertex as its input. In the case where the metric represents the cost of each link, the algorithm returns an indication of the least cost route from the root vertex to the particular vertex as well as the overall cost of the route.

The preferred implementation of the Dijkstra algorithm described below and illustrated by the example of FIG. 17 yields an identification of the node preceding each destination node along the shortest path from a particular node of origin. The procedure may then be extended to generate a set of ranked paths from each node to each other node. The path ranking is a function of both the path cost and its level of intersection with other paths.

Figure 16:
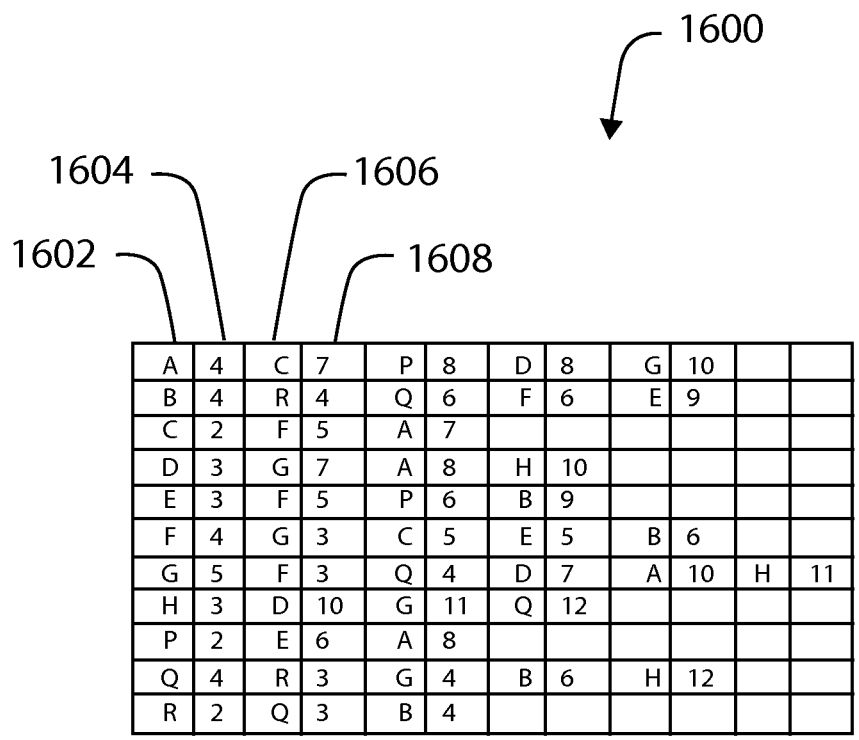
FIG. 16 illustrates a link table for the network of FIG. 14.

The method makes use of a link table. FIG. 16 shows a link table 1600 for the sample network 1400 of FIG. 14. Each row contains data respecting the links emanating from (rather than incoming to) a node. The first column 1602 is the node identifier. The second column 1604 is the number of links emanating from the node identified in column 1602. The remainder of the columns store blocks of link data. Each block has two fields, in the first field 1606 is an identifier of the node to which the respective link connects while the second field 1608 contains the cost of the link. It is computationally beneficial, but not necessary, to sort the blocks of link data in each row in table 1600 in an ascending order according to link cost. In practice, table 1600 is stored efficiently using a single array and pointers to the data related to each node.

FIGS. 17A and 17B show interim results of the steps of a method of determining the shortest path from a designated root node, node D, to each of the other 10 nodes in sample network 1400 of FIG. 14. The method is one of many possible, but is preferable for use in highly connected networks. A matrix 1700 of 3 rows and N columns, N being the number of nodes, is used for determining the routes from the designated root node to each of the other N-1 nodes. Row 1702, which, for ease of reference, may be considered a separate array S, stores the identifiers of all possible destination nodes, row 1704, which may be considered a separate array T, stores, for each destination node, the identifier of the preceding node along the path from the designated root node. Row 1706, which may be considered a separate array U, stores the path costs (i.e., the cumulative costs along each path). Array V (1708) of N entries serves as a pointer, constructed such that V(X) is the column number in matrix 1700 that contains the data on destination node X.

In the process of determining the shortest (least cost) routes, two markers are used. The first, j, indicates the index of the last "selected" destination node. The second, k, indicates the index of the last destination node that has been listed in matrix 1700. The procedure requires (N-1) steps. The marker j is the step number. At the beginning of each step j, the fth destination node is selected.

The procedure may be summarised as follows.

Matrix 1700 is initialised by listing the root node (D in this example) in array S of matrix 1700. The root node is listed in the $0^{th}$ position in array S: S(0)=D. Because no node can precede the root node, T(0)=D. And because the cost of the link from node D to itself is zero, U(0)=0.

Pointer array V 1708 may be initialised by a null entry for all but the root node. Since a valid pointer ranges from 0 to N-1 the number N (which is 11 in this example) is a suitable null entry. The value of V(D) is set to 0.

Initially, j and k are set to zero.

In each step, j, a new node is selected and other nodes may be listed in array S of matrix 1700. When a new node is selected, it is swapped into the jth position of array S. Swapping may not be necessary, however, if the node is already in that position. When a new node is listed, it is listed in the next available slot in array S, which is the slot indicated by k+1. Also, the appropriate preceding node is added to array T, and the array V is updated. At the beginning of a step, the listed but unselected nodes (nodes listed in S(j) to S(k)) are inspected and the node with the minimum path cost, as indicated by the respective entry in array U 1706, is "selected". Then, the links emanating from it, as given in table 1600 of FIG. 16, are processed. The outcome of processing a link is (1) introducing no changes in matrix 1700, (2) listing new nodes in matrix 1700, or (3) modifying the path and cost of a previously-listed node. When this process is complete, entries S(0) to S(N-1) list the N nodes in an ascending order according to their path costs from the node of origin (node D in this example). The entries in array S 1702 and array T 1704 in matrix 1700 are then used to generate an array W 1710, which stores the node Y immediately preceding each destination node X along the shortest path from a particular node of origin, W(X)=Y.

The reason S(j) to S(k), for j>0, indicate the listed but unselected nodes is as follows. Firstly, there are no elements in array S beyond index k. Secondly, all elements in array S up to that at index/have already been selected and so processing in respect of such nodes has been completed.

The procedure then proceeds as follows.

Step j=0

Node D is the only candidate node for selection and so it is selected. There are three links originating from node D, namely link D-G of cost 7, link D-A of cost 8 and link D-H of cost 11 as indicated in table 1600 of FIG. 16. Starting with the first link D-G, the value V(G) is inspected to determine whether node G has been listed on matrix 1700 or not. A value V(G) equal to N (a null entry) indicates that node G is not listed yet. If an entry in array V 1708 is less than N (and greater than or equal to zero), the information relating to corresponding node X is already listed in matrix 1700 in column V(X). Furthermore, if V(X) is found to be less than or equal to j, node X would be listed and already selected. In this first case, V(G) equals N, and the value of k=0. Thus, k is increased by unity, to k=1. Node G is listed in S(1) and listed in T(1) is the starting node of the link D-G, i.e., T(1)=D. The cost U(1) equals U(0)+7=7. V(G) is set to k (k=1). Next, link D-A is considered. V(A)=N, hence node A is not listed yet. Thus k is increased to k=2, and S(2) is set to A, T(2) to D and U(2) to 8. V(A) is then set to k (k=2). Next, link D-H is considered. V(H)=N, hence node H is not listed yet. Thus k is increased to 3, and S(3) is set to H, T(3) to D and U(3) to 11. V(H) is then set to k (k=3). Note that, after completion of step j=0, the value of k has increased to 3.

Step j=1

The nodes listed in S(j) to S(k) (S(1) to S(3)) are inspected to determine which has the least-cost path from the origin, node D. Here node S(1)=G happens to be the closest node to origin D in terms of cost. Node G is therefore "selected". There are five links originating from node G, G-F of cost 3, G-Q of cost 4, G-D of cost 7, G-A of cost 10 and G-H of cost 11, as indicated in table 1600 of FIG. 16. These links are now considered one at a time. The first link leads to node F. Note that V(F)=N, i.e., node F is not listed yet. Thus, k is increased by 1 to 4, S(4) is set to F, T(4) to G and U(4) to U(j)+3=10. Node F data is now in column 4, so V(F) is set to 4. The second link from node G is link G-Q. V(Q)=N, i.e., node Q is not listed yet. Thus, k is increased by 1 to 5, then S(5) is set to Q, T(5) to G and U(5) to U(j)+4=11. Node Q data is now in column 5, so V(Q) is set to 5. The third link leads to node D. V(D)=0, which is less than j. Hence, link G-D is irrelevant. The fourth link leads to node A. V(A)=2>j, indicating that node A has been listed but not selected yet. The cost of the existing path from D to A (U(2)=8) is compared to the cost of a path from D to A through G (U(1)+10=17). The lower-cost path is maintained in matrix 1700, the existing path in this case. The fifth link leads to node H. V(H)=3>j, indicating that node H has been listed but not selected yet. The cost of the existing path from H to D (U(3)=11) is compared to the cost of a path from H to D through G (U(1)+11=18). The lower-cost path is maintained in matrix 1700, the existing path in this case. Note that, after completion of step j=1, the value of k has increased to 5.

Step j=2

The listed nodes in S(j) to S(k) (S(2) to S(5)) are inspected. The closest to the root node is node A and so node A is "selected". Node A has four emanating links, to nodes C, P, D and G with associated costs of 7, 8, 8 and 10, respectively. V(C)=N, indicating that node C is not listed yet. Thus, k is increased by 1 to 6, then S(6) is set to C, T(6) to A and U(6) to U(j) +7=15. As node C data is now in column 6, V(C) is set to 6. V(P)=N, indicating that node P is not listed yet. Thus, k is increased by 1 to 7, then S(7) is set to P, T(7) to A and U(7) to U(j)+8=16. As node P data is now in column 7, V(P) is set to 7. V(D)=0<j, indicating that node D has been selected (of course, it is the originating node). V(G)=1<j, indicating that node G has been selected. Note that, after completion of step j=2, the value of k has increased to 7.

Step j=3

The listed nodes in S(j) to S(k) (S(3) to S(7)) are inspected. The closest to origin, in terms of cost, is node F (this is seen from an inspection of array T 1704 after step j=2). However, node H occupies column j=3. Consequently, the two columns are swapped such that V(F) is reset from 4 to 3 and V(H) is reset from 3 to 4. Node F has four emanating links, to nodes G, C, E and B, with associated costs of 3, 5, 5 and 6, respectively. V(G)=1<j, indicating that node G has been selected. V(C)=6>j, indicating that node C has been listed but not selected yet. The cost of the existing path from C to D (U(6)=15) is compared to the cost of a path from C to D through F (U(3)+5=15). The lower-cost path is maintained in matrix 1700, either path in this case. V(E)=N, indicating that node E is not listed yet Thus, k is increased by 1 to 8, then S(8) is set to E, T(8) to F and U(8) to U(j)+5=15. As node E data is now in column 8, V(E) is set to 8. V(B)=N, indicating that node B is not listed yet. Thus, k is increased by 1 to 9, then S(9) is set to B, T(9) to F and U(9) to U(j)+6=16. As node B data is now in column k=9, V(B)=9. Note that, after completion of step j=3, the value of k has increased to 9.

Step j=4

The listed nodes in S(j) to S(k) (S(4) to S(9)) are inspected. The closest to the root node, in terms of cost, are nodes H and Q. As the nodes are equidistant, node H may be chosen arbitrarily. Node H has three emanating links, to nodes D, G and Q, with associated costs of 10, 11 and 12, respectively. V(D)=0<j, indicating that node D has been selected. V(G)=1<j, indicating that node G has been selected. V(Q)=5>j, indicating that node Q has been listed but not selected yet. The cost of the existing path from Q to D (U(5)=11) is compared to the cost of a path from Q to D through H (U(4)+12=23). The lower-cost path is maintained in matrix 1700, the existing path in this case. Note that, after completion of step j=4, the value of k has not increased.

Step j=5

The listed nodes in S(j) to S(k) (S(5) to S(9)) are inspected. The closest to the root node is node Q. Node Q has four emanating links, to nodes R, G, B and H with associated costs of 3, 4, 6 and 12, respectively. V(R)=N, indicating that node R is not listed yet. Thus, k is increased by 1 to 10, then S(10) is set to R, T(10) to Q and U(10) tb U(j)+3=14. As node R data is now in column 10, V(R) is set to 10. V(G)=1<j, indicating that node G has been selected. V(B)=9>j, indicating that node B has been listed but not selected yet. The cost of the existing path from B to D (U(9)=16) is compared to the cost of a path from B to D through Q (U(5)+6 =17). The lower-cost path is maintained in matrix 1700, the existing path in this case. V(H)=4<j, indicating that node H has been selected. Note that, after completion of step j=5, the value of k has increased to 10.

The procedure continues until j=N-2. In this example, when j=5, the value of k has reached (N-1), hence all further steps for j=6 to j=9 (FIG. 17B) will not result in increasing the value of k. This is simply due to the fact that, with k=N-1, all null entries in array V have been overwritten by valid column numbers. When j=N-2, a 1×N array W1710 is then generated, which stores the node Y preceding each destination node X along the shortest path from a particular node of origin, W(X)=Y.

Note that array W is derived directly from arrays S and T in a straightforward manner. Once array W 1710 has been generated, the shortest path from D (in terms of cost) to any other node may be determined. For instance, if node E is chosen as destination node, array W1710 is consulted to learn that W(E)=F, W(F)=G and W(G)=D. From the preceding information, the shortest path from D to E is D-G-F-E. A similar array W may be derived for each node of network 1400 (FIG. 14).

As will be apparent to those skilled in the art, a metric other than cost, such as delay, may be assigned to the links between nodes.

In an alternative embodiment, rather than distribute a nodal routing table to each node, the controller distributes network topology information to each node. It is then the responsibility of each node to determine a nodal routing table. Other modifications will be apparent to those skilled in the art and, therefore, the invention is defined in the claims.

What is claimed is:

1. In a network of nodes interconnected by a plurality of directional links, a method performed by a controller of said network, said controller having a processor and a memory device, for populating a routing table comprising:
  determining a plurality of route sets, each of said route sets corresponding to a directed node pair defined by a source node and a sink node, said each of said route sets comprising a plurality of routes from said source node to said sink node;
  determining an inverse routing table indicating, for each respective directional link of said plurality of directional links, at least one node which is a source node of at least one route set that includes a route traversing said respective directional link;
  receiving state-change information related to a given directional link of said plurality of directional links;
  indexing said inverse routing table to identify a corresponding affected node, said affected node being a source node of a route set from among said plurality of route sets that includes at least one route traversing said given directional link; and
  transmitting said state-change information to said corresponding affected node.

2. The method of claim 1 wherein said state-change information indicates a failure of said given directional link.

3. The method of claim 1 wherein said state-change information indicates a recovery from failure of said given directional link.

4. The method of claim 1 further comprising adjusting at least one of said route sets according to said state-change information, wherein said adjusting marks each of said at least one route as unavailable when said state-change information indicates failure and restores said at least one route when said state-change information indicates a recovery from failure.

5. The method of claim 1 further comprising ranking said plurality of routes from said source node to said sink node according to a predefined metric.

6. A method of routing in a network having a plurality of nodes interconnected by a plurality of directional links, the method comprising:
  configuring a network controller having a network processor to:

generate a forward routing table defining a set of routes from each node to each other node of said plurality of nodes; and invert said forward routing table to determine for each respective directional link of said plurality of directional links a respective set of dependent nodes, each said dependent node having at least one route traversing said respective directional link; and distributing, from said network controller, to said each node a respective nodal routing table, derived from said forward routing table, defining routes originating from said each node.

7. The method of claim 6 further comprising determining, at said network controller, a cost of each route of said forward routing table.

8. The method of claim 7 further comprising sorting said set of routes according to cost to produce a sorted route set and retaining a predetermined number of routes in said sorted route set.

9. The method of claim 7 further comprising sorting said set of routes according to cost and a level of intersection of route pairs to produce a sorted route set and retaining a predetermined number of routes in said sorted route set.

10. The method of claim 6 further comprising selecting each route from a first node to a second node to comprise a directional link emanating from said first node to a neighbouring node followed by a least-cost path from said neighbouring node to said second node.

11. The method of claim 6 further comprising:
monitoring, at said each node, directional links from neighboring nodes and reporting to said network controller an identifier of any directional link experiencing a state change; and
relaying, from said network controller, reported state-change information to respective dependent nodes.

12. The method of claim 11 wherein said state-change information indicates one of:
a particular directional link changing from operational state to non-operational state;
said particular directional link previously reported as non-operational continuing to be non-operational; and
said particular directional link previously reported as non-operational changing to operational state.

13. The method of claim 6 further comprising:
monitoring, at said each node, directional links from neighboring nodes and reporting to said network controller an identifier of a directional link experiencing a state change; and
determining, at said network controller, an alternate route to a current route traversing said directional link and communicating description of said alternate route to an originating node of said current route.

14. The method of claim 6 further comprising acquiring, at said each node, route-selection software from an external software source and storing said route-selection software in a memory device of said each node to enable a node processor of said each node to select a route from said respective nodal routing table.

15. The method of claim 14 further comprising:
receiving at a specific node of said plurality of nodes notification of failure of a particular directional link of said plurality of directional links;
examining, at a node processor of said specific node, a nodal routing table of said specific node to identify each route originating from said specific node and traversing said particular directional link; and
marking said each route as unavailable.

16. The method of claim 15 further comprising:
receiving at said specific node notification of recovery of said particular directional link; and
restoring said each route.

17. A method of routing in a network having a plurality of nodes interconnected by a plurality of directional links, the method comprising:
configuring a network controller having a network processor to:
generate a forward routing table defining a set of routes from each node to each other node of said plurality of nodes; and
invert said forward routing table to produce an inverted routing table indicating for each respective directional link of said plurality of directional links a respective set of dependent nodes, each said dependent node having at least one route traversing said respective directional link;
receiving notification of change of state of a particular directional link of said plurality of links;
determining from said inverted routing table at least one route traversing said particular directional link; and
communicating information relevant to said change of state to an originating node of said at least one route.

18. The method of claim 17 further comprising
partitioning, at said network controller, said forward routing table into a number of nodal routing tables, each nodal routing table defining routes originating from a respective node of said plurality of nodes; and
distributing, from said network controller, to said each node a respective nodal routing table.

19. The method of claim 17 further comprising:
determining, at said network controller, an alternate route to a current route traversing said particular directional link; and
communicating a description of said alternate route to an originating node of said current route.

* * * * *